United States Patent [19]

Heckel

[11] Patent Number: 4,697,178
[45] Date of Patent: Sep. 29, 1987

[54] COMPUTER GRAPHICS SYSTEM FOR REAL-TIME CALCULATION AND DISPLAY OF THE PERSPECTIVE VIEW OF THREE-DIMENSIONAL SCENES

[75] Inventor: Todd A. Heckel, Clarksville, Md.

[73] Assignee: Megatek Corporation, San Diego, Calif.

[21] Appl. No.: 626,385

[22] Filed: Jun. 29, 1984

[51] Int. Cl.[4] .............................................. G09G 1/00
[52] U.S. Cl. ................................... 340/729; 340/723; 340/747; 364/521
[58] Field of Search ............... 340/729, 723, 747, 727, 340/750; 364/518, 521

[56] References Cited

U.S. PATENT DOCUMENTS

| | | | |
|---|---|---|---|
| 3,602,702 | 8/1971 | Warnock | 340/729 |
| 3,621,214 | 11/1971 | Romney et al. | 340/729 |
| 3,736,564 | 5/1973 | Watkins | 340/729 |
| 4,384,338 | 5/1983 | Bennett | 340/729 |
| 4,425,559 | 1/1984 | Sherman | 340/747 |
| 4,475,104 | 10/1984 | Shen | 340/723 |
| 4,570,233 | 2/1986 | Yan et al. | 340/747 |

OTHER PUBLICATIONS

*The Perspective Representation of Functions of Two Variables,* Kobert et al; 4/68; reprinted in Interactive Computer Graphics, IEEE Cat. #EHO 156-0, pp. 272-283.
*An Efficient Visible Surface Program;* Myers; 7/75, Ohio State University; Grant #DCR 74-00768 A01.

Primary Examiner—Marshall M. Curtis
Attorney, Agent, or Firm—Antonelli, Terry & Wands

[57] ABSTRACT

A computer graphics system and process for displaying three-dimensional scenes as perspective views on the view reference plane of a display device is disclosed which removes hidden lines and surfaces from the display. The system and process utilizes a scan line algorithm which minimizes storage requirements and is efficiently implementable in hardware.

38 Claims, 20 Drawing Figures

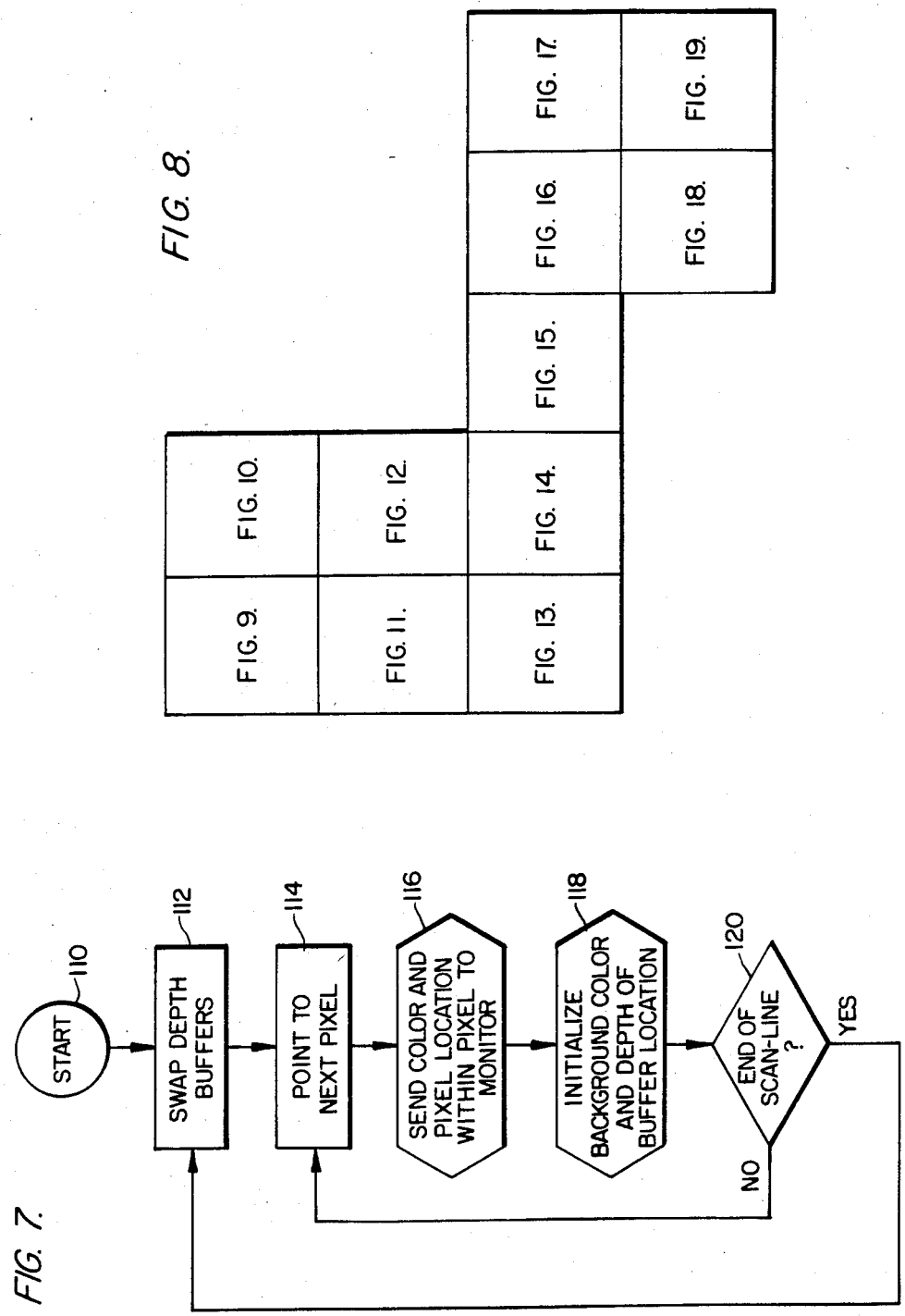

COMPUTER GRAPHICS SYSTEM FOR REAL-TIME CALCULATION AND DISPLAY OF THE PERSPECTIVE VIEW OF THREE-DIMENSIONAL SCENES

BACKGROUND OF THE INVENTION

1. Field of the Invention

The present invention relates to a system and process for the creation, manipulation and perspective display of complex scenes having one or more three-dimensional objects. More particularly, the invention relates to systems and processes of the above-described type which remove hidden lines and surfaces from the display of three-dimensional scenes on a two-dimensional view reference plane of a display device.

2. Description of the Prior Art

Computer graphics systems display perspective views of complex scenes made up of one or more three-dimensionl objects in a two-dimensional view reference plane of a display device such as a video monitor. The basic apparatus and processes for the display of three-dimensional scenes in a view reference plane of a two-dimensional display device are well known, as exemplified by descriptions in textbooks such as "Fundamentals of Interactive Computer Graphics," by J. D. Foley and A. VanDam, Addison-Wesley Publishing Co., 1982.

Several basic processes are required in the creation and display of a three-dimensional scene as a perspective view on the view reference plane of a display device. In the first place, the scene to be perspectively displayed must be mathematically represented in three-dimensional spatial coordinates to permit its transformation by matrix calculations into a mathematical representation of a perspective view referenced with respect to the view reference plane of the display device. One known way of mathematically representing a three-dimensional scene is to define it as a plurality of objects each having a plurality of planar surfaces such as triangles or tetrahedrons each defined by a listing of its vertices. The number of surfaces required to mathematically represent any scene containing a plurality of objects is a function of the complexity of the scene to be displayed and the degree of required resolution. With reference to FIG. 1 of the drawings, a cube 10 may be mathematically represented by six faces each defined by four of the eight total vertices. More complex objects require proportionally more surfaces and a greater number of vertices. A description of the process of mathematically representing a three-dimensional scene by polygons defined by vertices is described on pages 295-301 of "Tutorial: Computer Graphics," by Kellogg S. Booth, IEEE Catalog No. EHO 147-9, 1979.

The transformation of the three-dimensional mathematical representation of the scene to be displayed to a two-dimensional mathematical perspective referenced to the view reference plane is known as perspective transformation. The complete transformation from the three-dimensional "object" coordinate system to a two-dimensional perspective coordinate system having depth referenced with respect to the view reference plane is performed by two separate matrix transformations. The first coordinate transformation expresses the location of the objects defining the scene relative to the world coordinate system. The second coordinate transformation applies a perspective mapping onto the view reference plane. The foregoing transformations are known and described in detail in "Tutorial: Computer Graphics," supra, on pages 300-303, and in Chapter 8 "Fundamentals of Interactive Computer Graphics", supra.

The removal of hidden surfaces and lines from the scene to be produced is necessary for the creation of a realistic perspective view. Hidden surfaces and lines are those surfaces and lines which are obscured by parts of the scene located closer to the view reference plane. The matrix transformations of a scene into a mathematically defined perspective view transforms all of the lines and surfaces of the scene which are present. Display of the mathematically defined perspective view without hidden surface and line removal creates an unrealistic perspective view. With reference to FIG. 1 with the view reference plane considered to be the plane of the drawing containing FIG. 1, cube 10 contains three hidden lines and three hidden surfaces which are respectively identified by the dotted line segments 6-4, 3-4, and 4-1 and the surfaces defined by vertices 3456, 1234, and 1467. The subject matter of the present invention pertains to the generation of a perspective view of object which typically are much more complex than cube 10 with the removal of hidden surfaces and hidden lines from a perspective display.

Algorithms are known in the prior art for the removal of hidden surfaces and hidden lines. The "Tutorial: Computer Graphics", supra, contains a description of ten hidden surface removal algorithms. Algorithms are described therein on pages 324-326 which determine the visibility of surfaces of different depth as defined with respect to the view reference plane along a single line of scanning of a display device. These line algorithms compare the depth of line segments from the various faces which are projected from different depths on the z axis to an intersection along the x direction of scanning to cause the display of only those line segments which are disposed closest to the view reference plane. U.S. Pat. Nos. 3,736,564, 3,621,214 and 3,602,702 further describe known hidden surface removal algorithms. Scan line algorithms are also discussed in section 15.6 of the "Fundamentals of Interactive Computer Graphics", supra.

An additional algorithm for the removal of hidden surfaces is the z-buffer algorithm which is described in section 15.5 of the "Fundamentals of Interactive Computer Graphics", supra. This algorithm stores in memory the depth values of each pixel of a frame along the lines of scanning. This algorithm, while simple in programming comcept, requires substantial computer time and memory to implement because each pixel of each polygon is stored in the depth buffer and compared with the pixels of all of the other polygons to determine the pixels lying closest to the view reference plane.

An important aspect of the implementation of a hidden surface algorithm in a computer graphics system is the time required to perform the mathematical processing necessary to identify those surfaces which should be displayed and those surfaces which should be discarded as hidden surfaces. All hidden surface algorithms require a comparison of information from a potentially visible area, scan line, or point basis within a surface with the corresponding area, scan line, or points of other potentially visible surfaces. The computation time required for a computer to perform the necessary comparisons and sorting depends on the number of records to be processed, the algorithm used to perform the comparisons and sorts, and the statistical properties of the records being compared and sorted. The precise properties of sorting and comparing techniques are of tremendous importance in the overall time required to implement a hidden surface algorithm. Certain techniques require more storage space than others and some lend themselves to fast hardware implementation more easily than others.

Scan line algorithms compute the intersection of each surface of the three-dimensional scene which is to be perspectively illustrated on the view reference plane with the x axis of line to be scanned. The line segments resulting from the intersection of the view reference plane are called segments.

Scan line algorithms are based upon the coherent property of segments in which the variation from scan line to scan line is statistically small. The creation of line segments simplifies the hidden surface problem to a two-dimensional problem of segments measured by the x and z coordinates given the fact that the y coordinate is a constant. Elimination of the variation of the y coordinate requires simpler computations than those which are required in three-dimensions for area algorithms for removing hidden surfaces.

The Watkins algorithm, as described on pages 324–326 of the "Tutorial: Computer Graphics", supra, and U.S. Pat. No. 3,736,564, initially determines the beginning and end points of the intersection of each segment with the x axis of the line of scanning. When more than one segment is determined to have at least a partially overlapping beginning and end points along the x axis, the algorithm subdivides the initial segments in half repeatedly until either there is no overlap on the x axis or until the problem of determining which segment lies closest to the view reference plane becomes simple or approaches the limit of resolution of the overall system and therefore can be discarded. The Watkins algorithm requires extensive computation time to generate the list of sufficiently subdivided segments when highly complex scenes having many potentially visible faces are being procesed. Thus, Watkins algorithm has a progressively increasing computation time overhead as the complexity of the scenes to be displayed increases.

SUMMARY OF THE INVENTION

The present invention is a system and process for the removal of hidden surfaces and lines from a three-dimensional scene having one or more objects each having a plurality of planar surfaces which is being displayed as a persepective view on the view reference plane of a two-dimensional display device. Hidden surface removal is performed at high speed in a hardware raster processor using a scan line depth buffer algorithm. The algorithm produces a high speed generation of a perspective view of complex three-dimensional scenes without hidden surfaces with less calculating time and memory than the prior art algorithms and provides a high ratio of performance to cost when compared to currently available commercial systems.

The algorithm of the present invention minimizes the computation time by utilizing a line segment analysis of the scene to be displayed in which only the depth information for each pixel within each line segment within each line to be scanned is compared with depth information of the corresponding pixel in a depth buffer. The display information and depth information of each pixel is stored in the depth buffer only when the depth information of the pixel being compared with the corresponding depth information in the depth buffer lies closer to the view reference plane. The storage of display information of only pixels closer to the view reference plane than the stored display information minimizes time consuming storage of information and minimizes the amount of memory required. Moreover, the computation time required to identify segments along the line of scanning whose pixels are to be compared with the depth information in the depth buffer is minimized by not utilizing a routine for nondeterministically identifying line segments located on the x axis which do not overlap in the z axis such as the routine described in U.S. Pat. No. 3,736,564. Computation time is also minimized by not adding computation overhead to the overall processing time for those pixels to be displayed as background information from the depth buffer.

A system for generating and displaying perspective images without hidden surfaces in a view reference plane on a display device by scanning a plurality of scan lines each having a plurality of pixels of a scene having one or more three-dimensional objects in which each object has a plurality of planar surfaces includes means for storing the one or more objects to be displayed as a three-dimensional mathematical representation; means for processing the three-dimensional mathematical representation of the one or more objects to generate a list of segments along the direction of scanning of the lines at the intersection in the view reference plane of the scan lines with surfaces of the one or more objects; means for storing for each segment of each line to be scanned information enabling the identification of the beginning and end pixels of the intersection of each of the segments along each of the lines to be scanned and information permitting the calculation of the depth of each cell within each segment with respect to the view reference plane; depth buffer means, having a number of addressable storage locations for storing depth display information of pixels of parts of the one or more objects to be displayed and storing in each of the storage locations display information including background information to be displayed where a surface of the one or more objects is not present along the line to be scanned; means for calculating for each pixel within each segment of a line to be scanned its depth with respect to the view reference plane; means for comparing the calculated depth for each pixel within each segment of the line to be scanned with the depth information stored in the depth buffer means having the same address as the pixel the depth of which has been calculated and storing depth and display information in the depth buffer means at the address at which the data which was compared is stored for each pixel within each segment of the line to be scanned when the calculated depth information is closer to the view reference plane than the depth information stored at the addressed location of the depth buffer means to generate a line of display information; and means for causing the displaying of the display information stored within the addressable storage locations of the depth buffer means on the display device to generate a visible line of display information of parts of the one or more ojects for each pixel disposed closest to the view reference plane after the completion of storing of the display information.

Further in accordance with the system of the present invention, the information stored in the means for storing for each segment includes the address along the line of scanning of the beginning and end pixels within the segment, information which is a function of the depth of the beginning cell within the segment with respect to the view reference plane and the rate of change perpendicular to the view reference plane of the depth between the beginning and ending pixels within the segment. Preferably, the information stored in the means for storing which is a function of the depth of the beginning pixel is the depth of the beginning pixel. Preferably, the information stored in the means for storing which is a function of the rate of change is the rate of change $\Delta Z$ per pixel between the beginning and ending pixels of a segment. The depth of each pixel for each segment is calculated by the means for calculating by addition of the quantity $\Delta Z$ to the depth of the preceding pixel. The depth of the first pixel is determined from the 17th through 36th bits of the segment word as described in FIG. 4(b).

A process for generating and displaying perspective images without hidden surfaces in a view reference plane on a display device by scanning a plurality of scan lines each having a plurality of addressable pixels of a scene having one or more three-dimensional objects in which each object has a plurality of planar surfaces includes storing the one or more objects to be displayed as a three-dimensional mathematical representation; processing the three-dimensional mathematical representation of the one or more objects to generate a list of segments along the direction of scanning of the scanning lines at the intersection in the view reference plane of the scanning lines with surfaces of the one or more objects; storing for each segment of each line to be scanned information enabling the identification of the beginning and end pixels of the intersection of each of the segments along each of the lines to be scanned and information permitting the calculation of the depth of each pixel within each segment with respect to the view reference plane; initializing addressable storage locations for storing depth and display information of pixels of parts of the one or more objects to be displayed along the line to be scanned contained in a depth buffer with background information to be displayed when a surface of the one or more objects is not present along the line to be scanned; calculating for each pixel within each segment its depth with respect to the view reference plane; comparing the calculated depth for each pixel within each segment of the line to be scanned with the depth information stored in the depth buffer having the same address as the pixel the depth of which has been calculated; storing the depth and display information in the depth buffer for each pixel at the address at which the data which has been compared is stored for each pixel within each segment of the line to be scanned when the calculated depth information is closer to the view reference plane than the depth information stored at the addressed location of the depth buffer to generate a line of display information; and displaying the display information stored within the addressable storage locations of the depth buffer on a display device to generate a visible line of display information of parts of the one or more objects from each pixel disposed closest to the view reference plane after the completion of storing of the display information.

The information stored for each segment includes the address along the line of scanning of the beginning and end pixel within the segment, information which is a function of the depth of the beginning cell within the segment with respect to the view reference plane and the rate of change perpendicular to the view reference plane of the depth between the beginning and ending pixels within the segment. The information which is a function of the depth of the beginning pixel may be the depth of the beginning pixel and the information on the rate of change is the aforementioned quantity $\Delta Z$. The depth of each pixel for each segment is calculated by addition of the quantity $\Delta Z$ to the depth of the preceding pixel. The depth of the first pixel is determined from the 17th through 36th bits of the segment word as described in FIG. 4(b).

As used herein, the term "pixel" defines the smallest unit of resolution along the line of scanning of the display device which the invention utilizes in the elimination of hidden surfaces.

BRIEF DESCRIPTION OF THE DRAWINGS

FIG. 7 is a flowchart of the process performed by the video processor in the display of the contents of the depth buffer of FIG. 2.

FIG. 8 is a figure map of the organization between FIGS. 9-19.

DESCRIPTION OF THE PREFERRED EMBODIMENT

Figure 1:
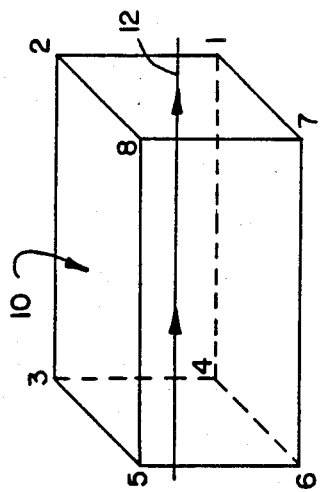
FIG. 1 illustrates a simple scene to be perspectively displayed which includes hidden lines and surfaces.

The necessity of removing hidden surfaces and lines from a perspective display of a three-dimensional object in a view reference plane is illustrated with reference to cube 10 in FIG. 1. The dotted line segments 6-4, 3-4 and 5-1 and associated surfaces defined by vertices 3456, 1234 and 1467 should not be displayed to produce a realistic perspective view of the cube 10 on a view reference plane of a display device. The present invention eliminates hidden lines and surfaces with the usage of a hardware based high speed raster processor 26 (FIG. 2) which implements a hidden surface algorithm described in detail in conjunction with FIG. 6 which uses minimal memory and calculation time.

Figure 2:
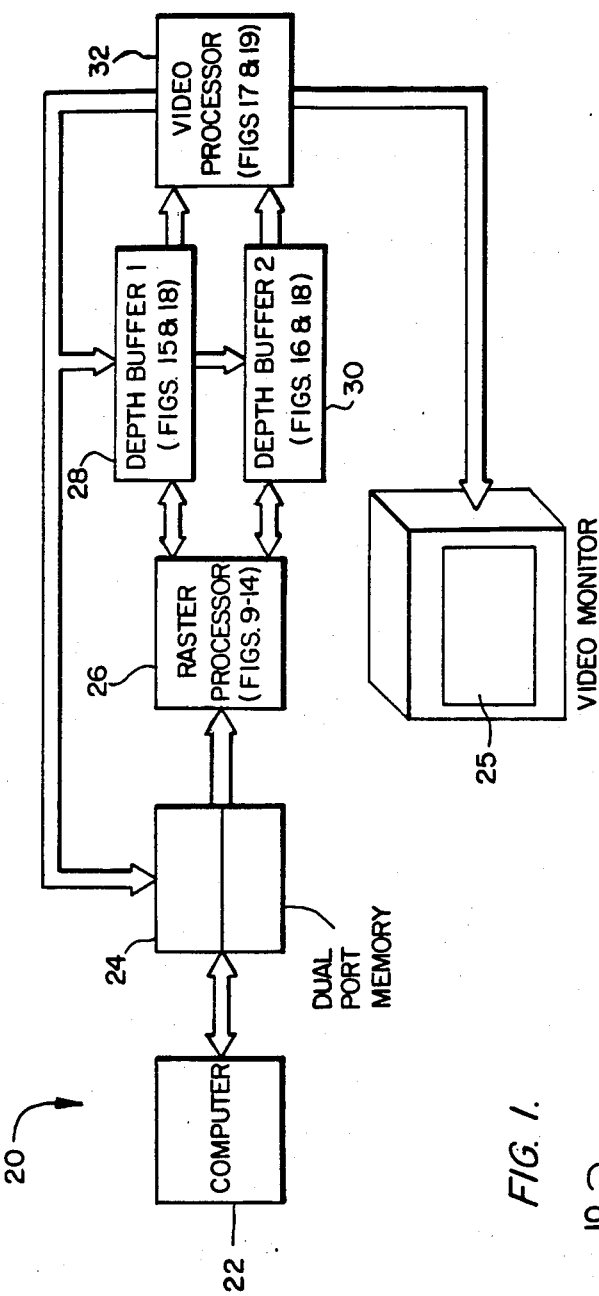
FIG. 2 is a system schematic of the present invention.
Figure 15:
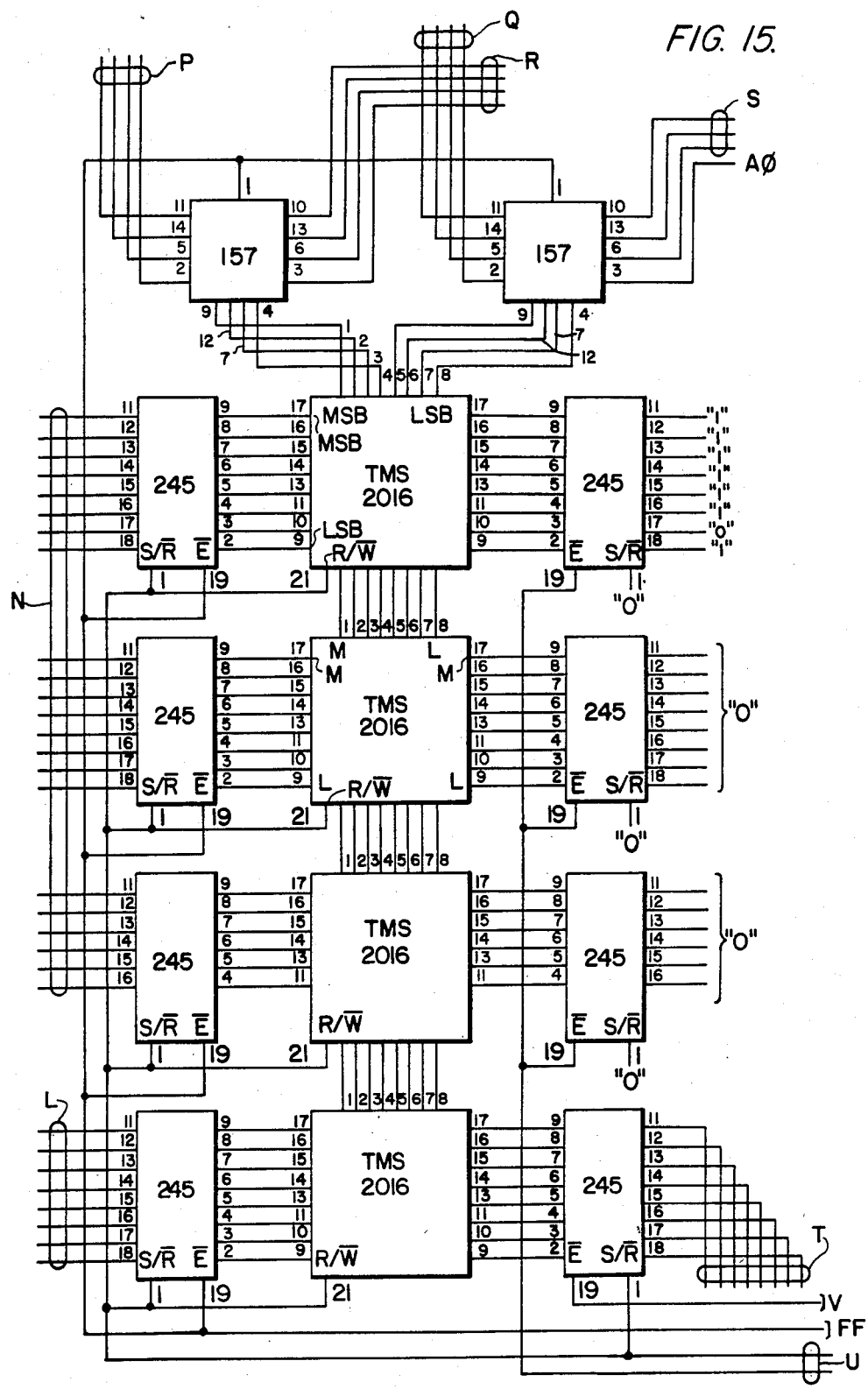
Figure 16:
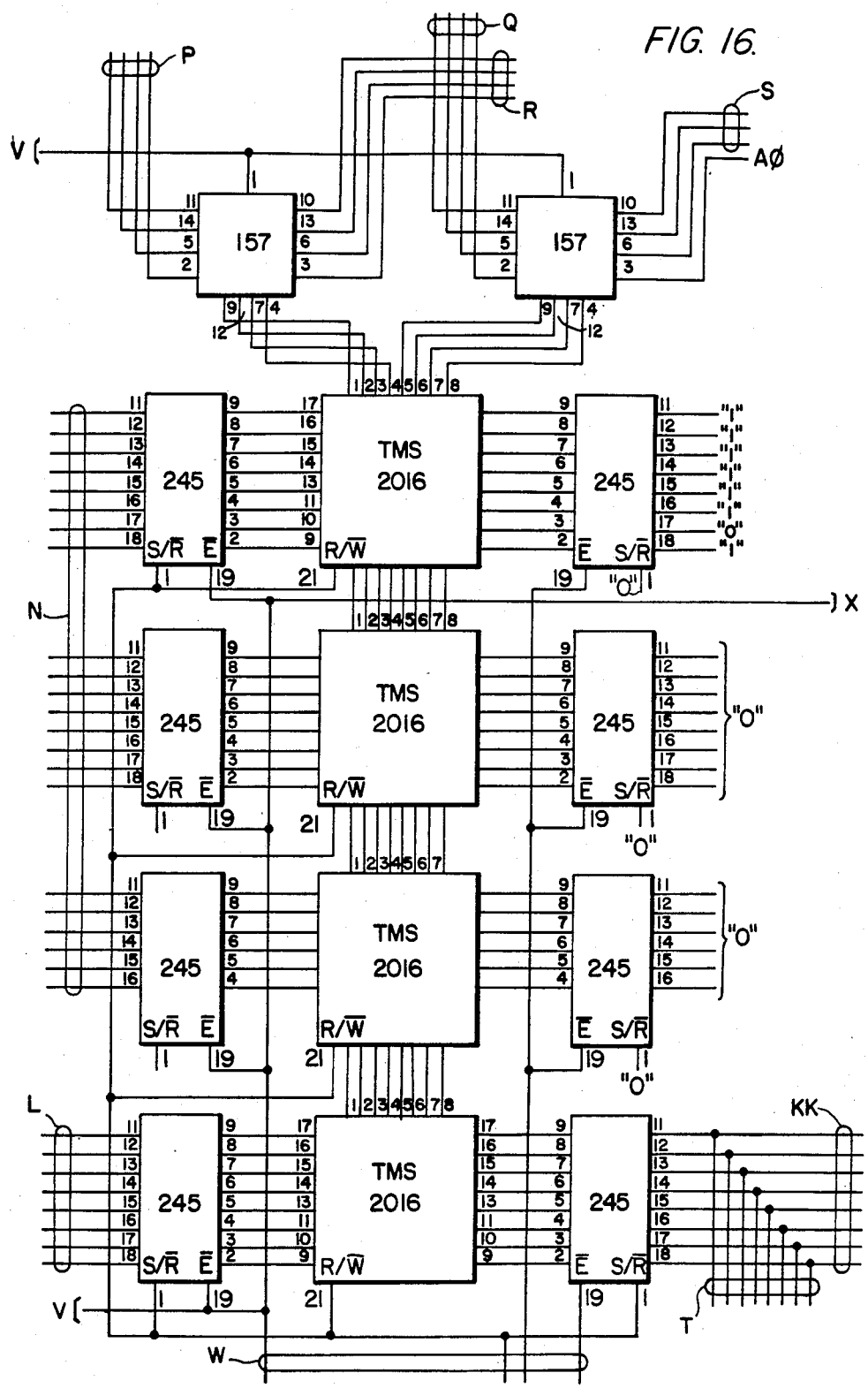
Figure 17:
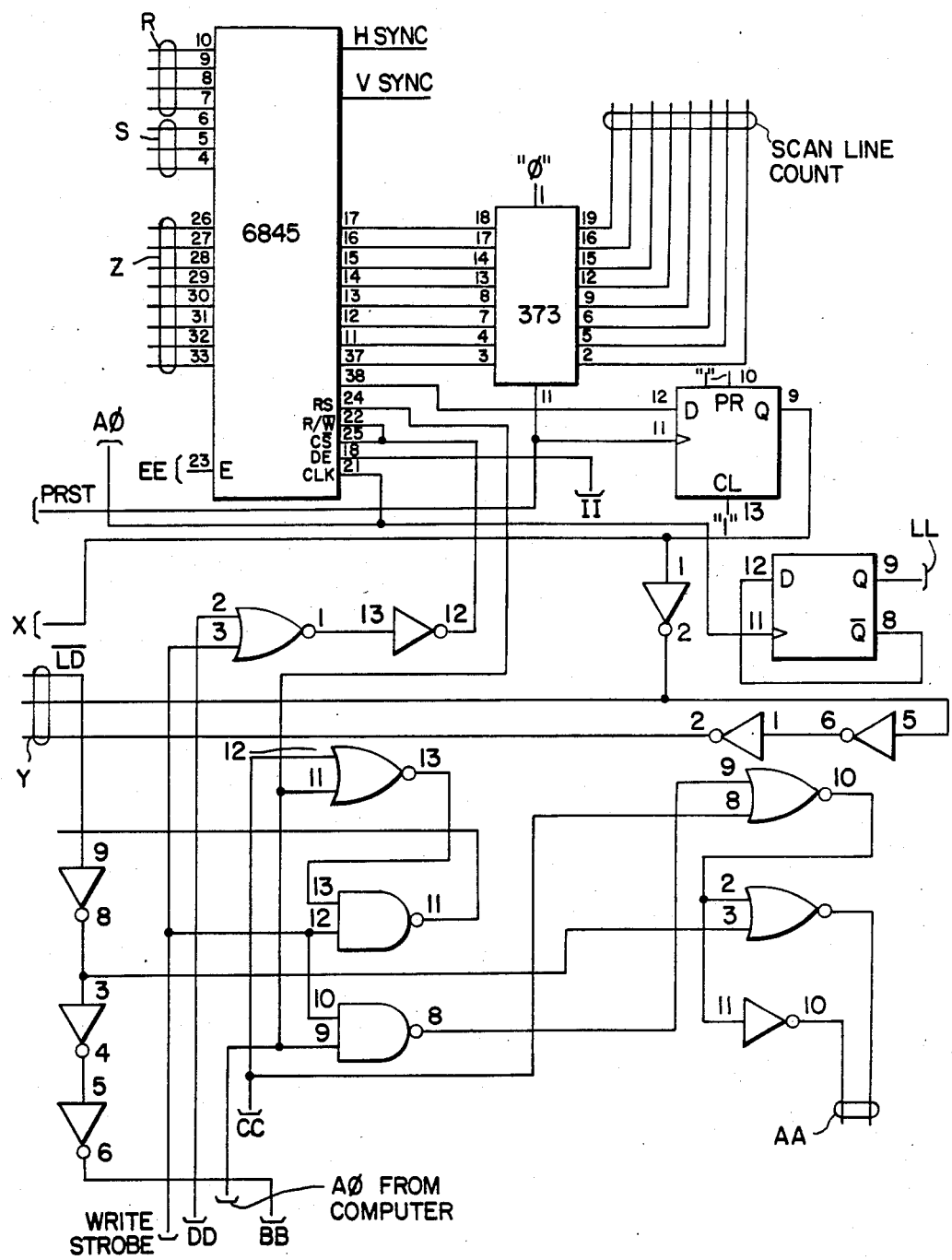
Figure 18:
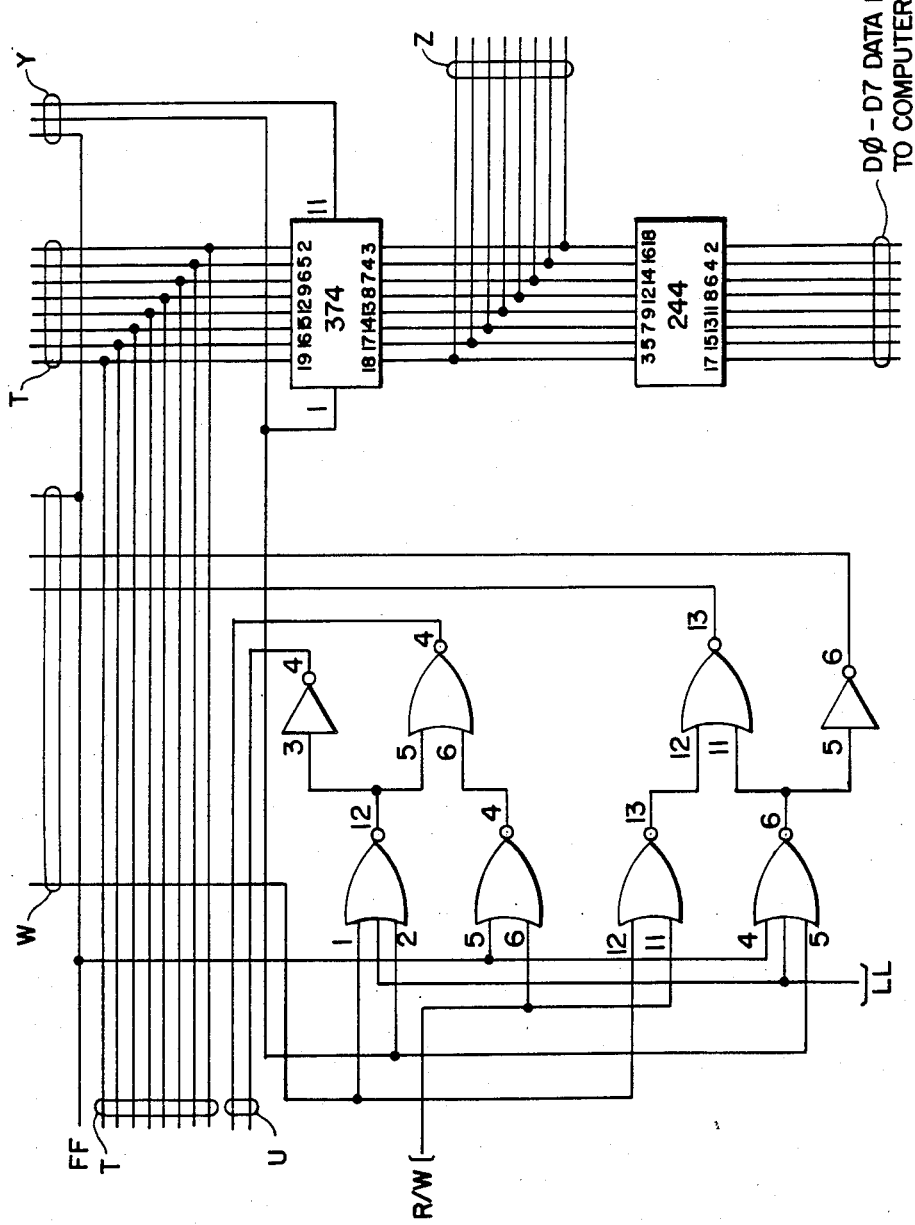
Figure 19:
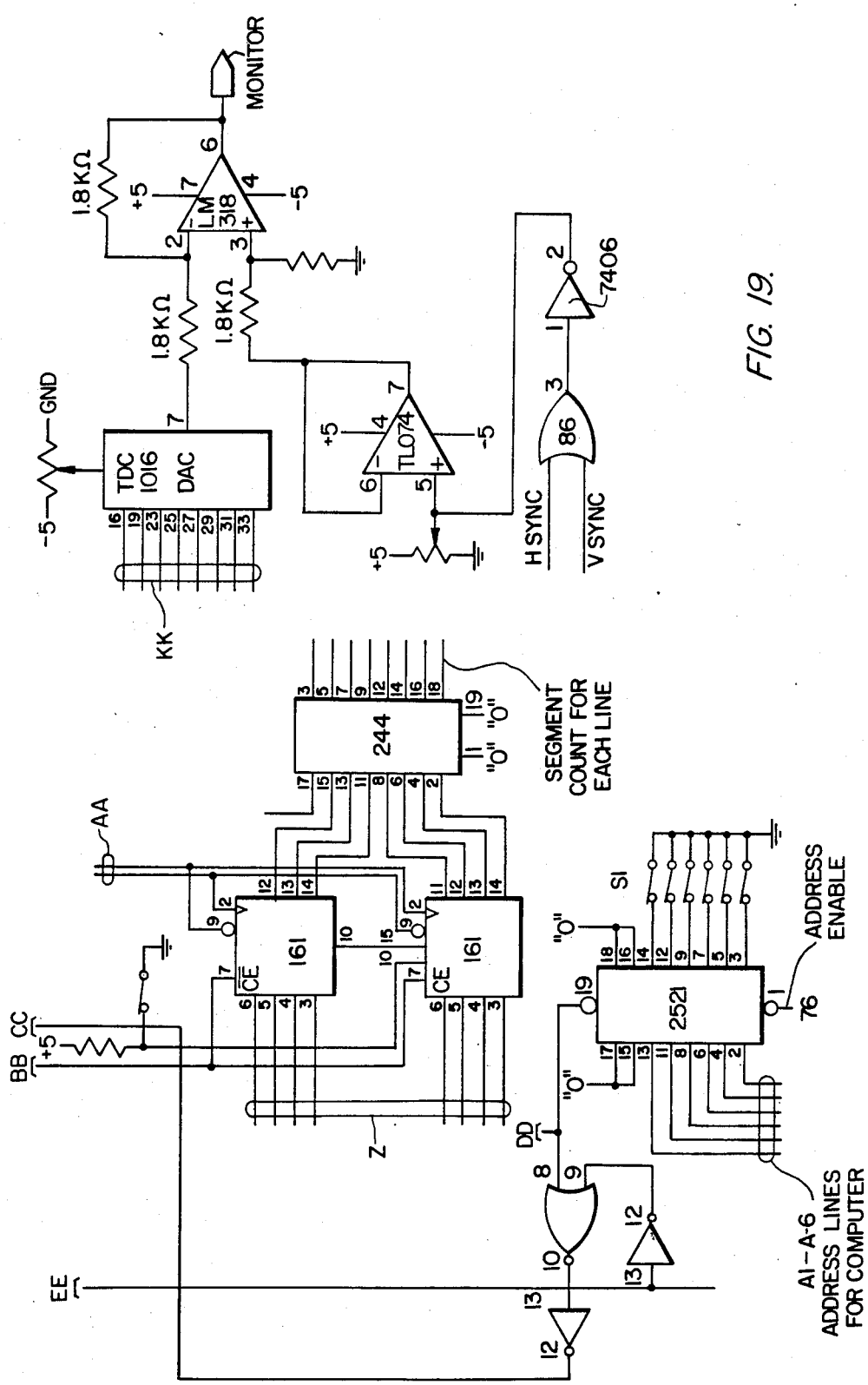

FIG. 2 illustrates an overall system schematic of the present invention. The system 20 includes a suitably programmed digital computer 22 which is coupled to a dual port memory 24 which contains two identical half sections for storing information pertaining to at least a plurality of scanning lines of a full frame of video to be displayed on video monitor 25. While the invention is not limited to the use of any particular computer, a personal computer, such as the International Business Machines Personal Computer, may be used. The respective halves of the dual port memory are coupled to the raster processor 26. The preferred implementation of the raster processor is illustrated in FIGS. 9-14. The raster processor 26 includes a pipeline which is multiplexed to respective identical depth buffers 28 and 30. Each depth buffer is loaded with display information to be displayed on the video monitor 25 during one line of scanning for read out during the next line of scanning to cause the display of the three-dimensional scene on the video monitor under the control of video processor 32. The preferred embodiment of the depth buffer 28 is illustrated in FIGS. 15 and 18. The preferred embodiment of the depth buffer 30 is illustrated in FIGS. 16 and 19. The video processor 32 controls the time base for the processing of information obtained from the dual port memory 24 by the raster processor 26 and the display of the perspective view of the scene on the video monitor 25. The preferred embodiment of the video processor is illustrated in FIGS. 17 and 19. The video monitor 25 is of conventional construction.

Figure 3:
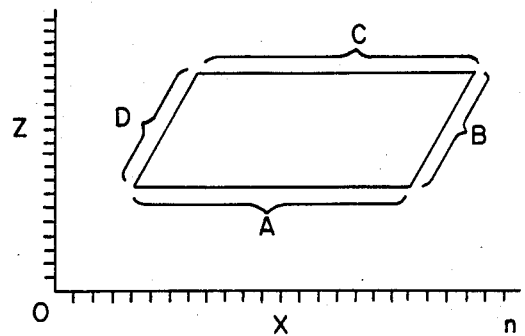
FIG. 3 illustrates the depth of the pixels of the various segments along a line of scanning of the scene of FIG. 1.

The digital computer 22 is programmed in accordance with techniques known in the art. The digital computer 22 performs the tasks of storing the one or more objects to be displayed as a three-dimensional mathematical representation, and processing the three-dimensional mathematical representation to generate a list of line segments along the direction of scanning of the scanning lines of the intersections in the view reference plane of the scanning lines with the surfaces of the one or more objects. The "Tutorial: Computer Graphics", supra, "Fundamentals of Interactive Computer Graphics", supra, and U.S. Pat. No. 3,736,564 describe implementations of the functions performed by the computer 22. The generation of a list of line segments for the cube 10 of FIG. 1 for the line of scanning 12 is illustrated in FIG. 3. FIG. 3 graphically illustrates as a function of the x and z axis coordinates the segments for intermediate line of scanning 12 across the video monitor 25 which intersects the faces 5678, 1278, 1234, and 3456 of the cube 10 of FIG. 1. The line segment intersecting face 5678 is identified by the reference A. The line segment intersecting the face 1278 is identified by the reference B. The line segment intersecting face 1234 is identified by the reference C. The line segment intersecting the face 3456 is identified by the letter D. The scribed lines on the x axis identify the addresses of the respective pixel locations along the x line of scanning. The left most pixel address is identified by zero at the intersection of the x and z axes and the right most pixel address is identified by the integer n. The number of pixels in a line is a function of the memory space utilized in the system. A greater number of pixels per line increases the system resolution. With reference to FIG. 3, hidden line and surface processing by the present invention will remove from view all of line segments C and D when the reference line 12 of cube 10 is scanned by video monitor 25 because these segments are totally obscured by the faces defined by vertices 5678 and 1278 of FIG. 1.

Each pixel 1 thru n of each of the lines of scanning is addressed by its pixel number as illustrated along the x axis of FIG. 3. The identical depth buffers 28 and 30 each have a number of storage cells which is equal to the number of pixels per line of scanning. Each storage location in the depth buffers is addressed by the address 1 thru n of the corresponding pixels of a line of scanning during the comparison and storage operations described, supra.

Figure 4A:
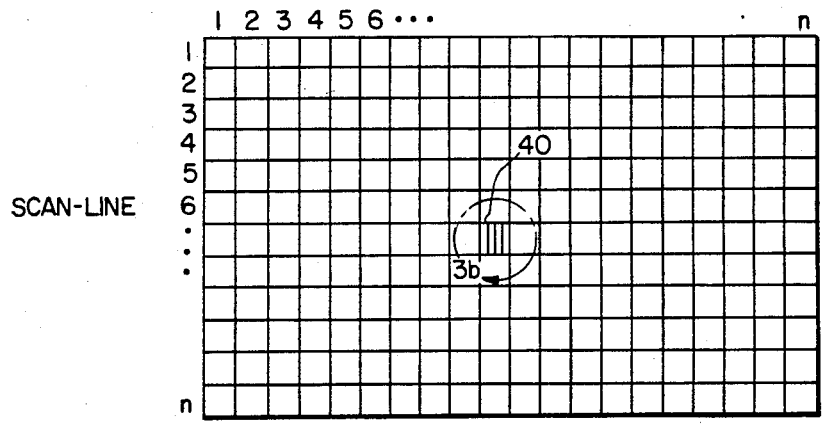
FIG. 4(a) is an illustration of a memory map of the dual port memory of FIG. 2 which stores segment information for a plurality of lines of the scene to be perspectively displayed on a display device.

FIG. 4(a) illustrates a memory map of one-half of the dual port memory 24. Each half of the dual port memory 24 preferrably stores an entire field of segment data, but may store less than a full field of segment data with modification of the timing signals of the video processor of FIGS. 17 and 19. For each line of scanning, when one-half of the dual port memory 24 is being loaded, the other is being read out for display processing by the raster processor 26. Each half of the dual port memory 24 may be considered as a matrix of segments as exemplified by the references A–D of FIG. 3. The storage space of each half of the dual port memory 24 is configured on a line basis of scanning to permit storage of part or all of a video field of information which is ultimately processed and displayed on the video monitor 25. The number of line segments which may be stored per line of scanning and the number of scanning lines which are contained within the matrix is a design choice which is a function of the available memory in the system.

Figure 4B:
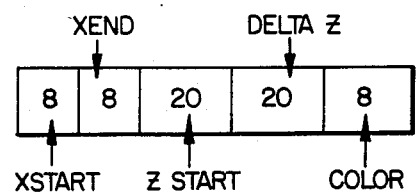
FIG. 4(b) is a bit map of the information used to encode the individual segments illustrated in FIG. 4(b).

Each segment 40 is stored as a multibit word having a preferred organization as illustrated in FIG. 4(b). The information content of the entire word is referred to as the depth information and the display information. Each word which defines a segment preferably has 64 bits. The first eight bits of the segment word encode the address of the pixel of the beginning of the segment which is the left most pixel in a segment when the video monitor 25 scans from left to right. With reference to FIG. 3, the beginning address of each of the segments A, B, C, and D, is the left most pixel of those segments along the x axis. The next eight bits are used to encode the address of the ending pixel of each of the segments along a line of scanning. With reference to FIG. 3, the end address of each of the segments A, B, C and D are their right most pixels. The next 20 bits are used to encode the depth information of the beginning pixel of each of the segments along the line of scanning. The next 20 bits are used to encode the quantity $\Delta Z$ wherein $$\Delta Z = (Z \text{ end} - Z \text{ start})/n$$

with Z start being the depth with respect to the view reference plane of the beginning pixel in the segment; Z end is the depth with respect to the view reference plane of the end pixel in the segment; and n is the number of pixels contained in the segment. The last 8 bits are used to encode color which is the display information used by video monitor 25.

Figure 12:
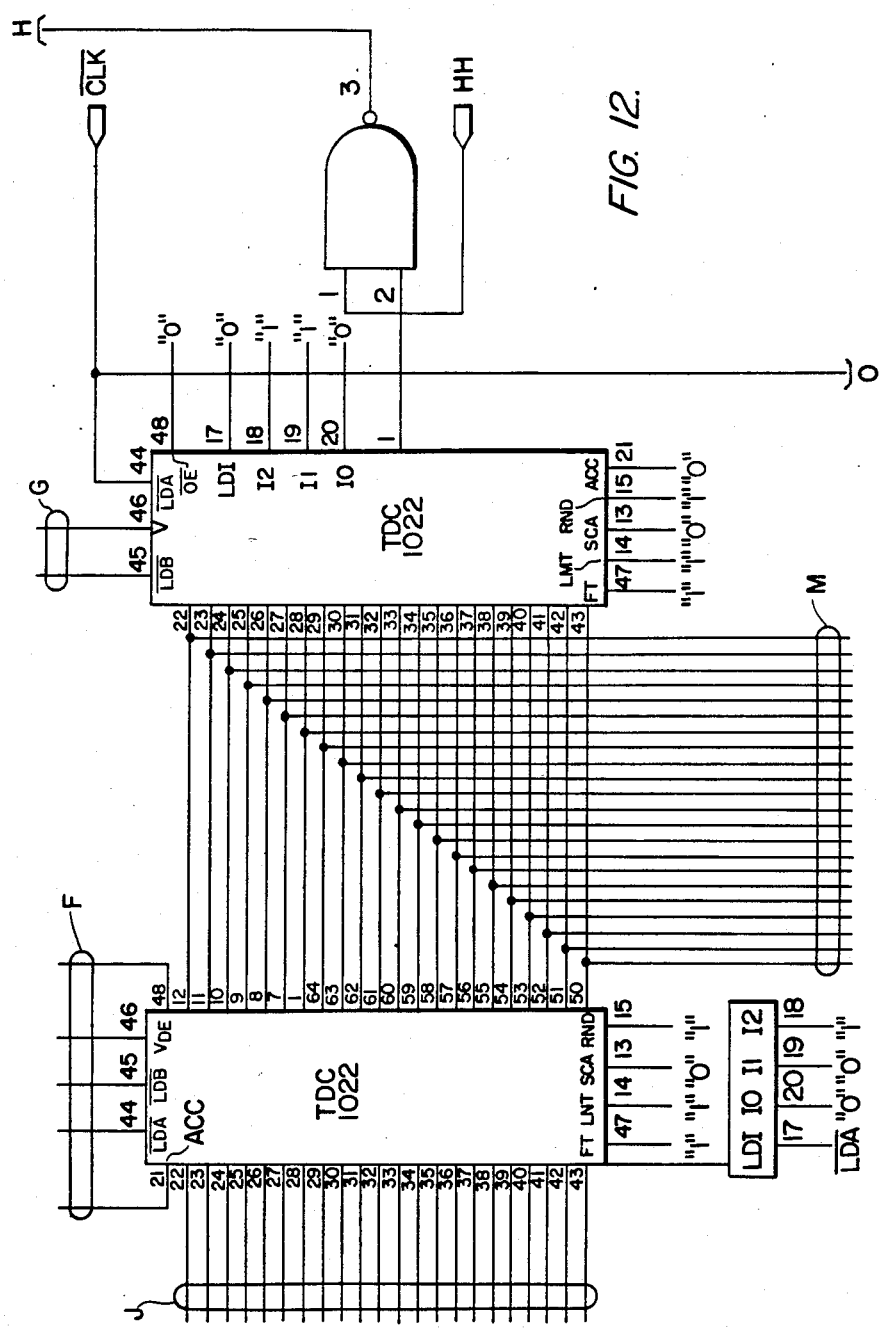
Figure 13:
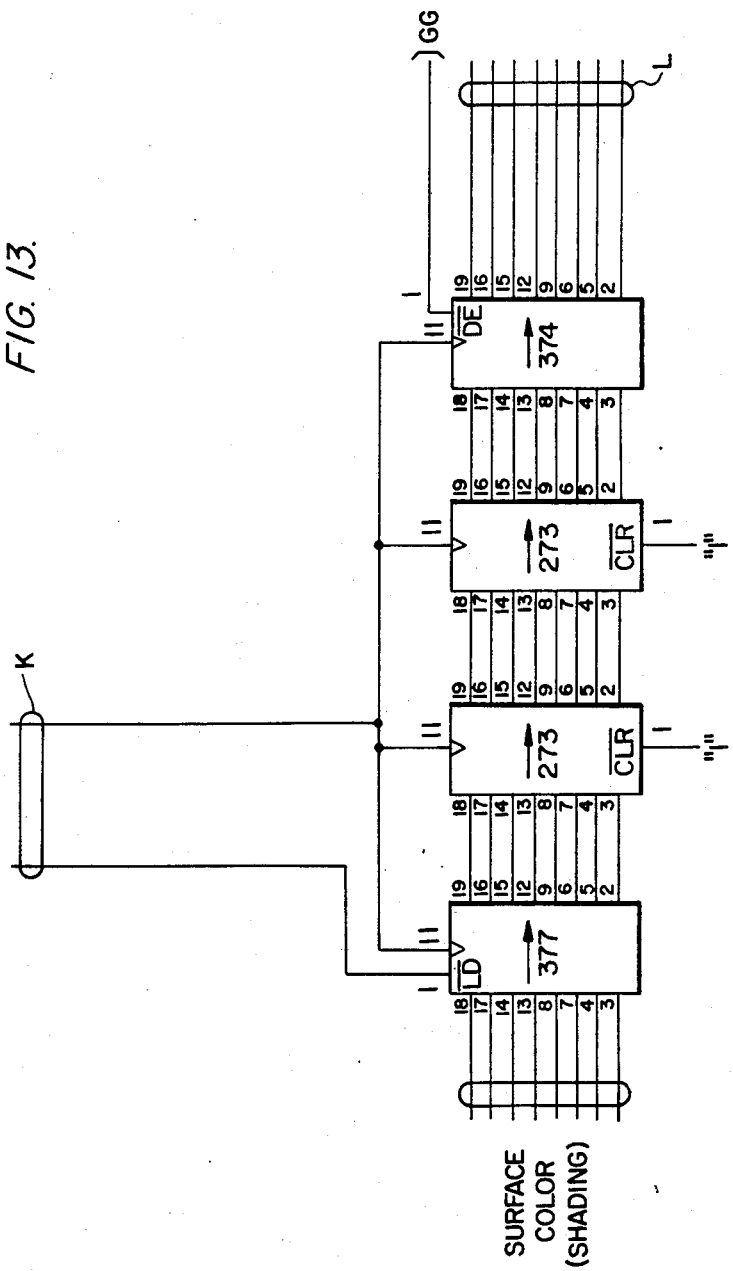
Figure 14:
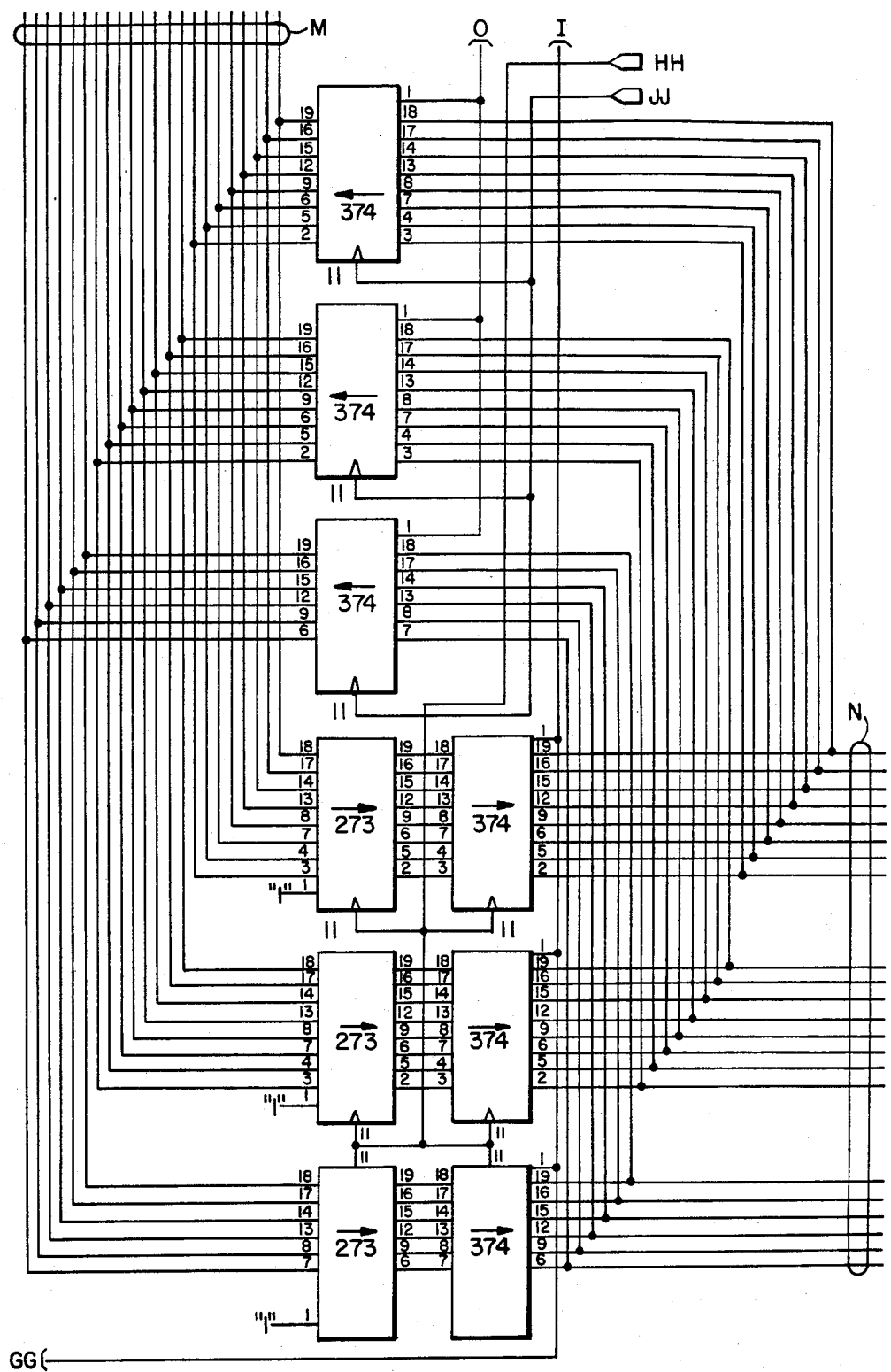

The present invention uses the depth of pixels in making depth cooomparisons with respect to the view reference plane for the reason that variation of the depth of an object along the Z axis as transformed by the matrix calculations described, supra, is a linear function of depth along the Z axis. The solution of a linear relationship is simpler and faster in hardware than a non-linear relationship. The floating point adder, integrated circuits "TDC 1022", illustrated in FIG. 12, are readily usable to solve the aforementioned linear depth relationship at high speed.

Figure 5:
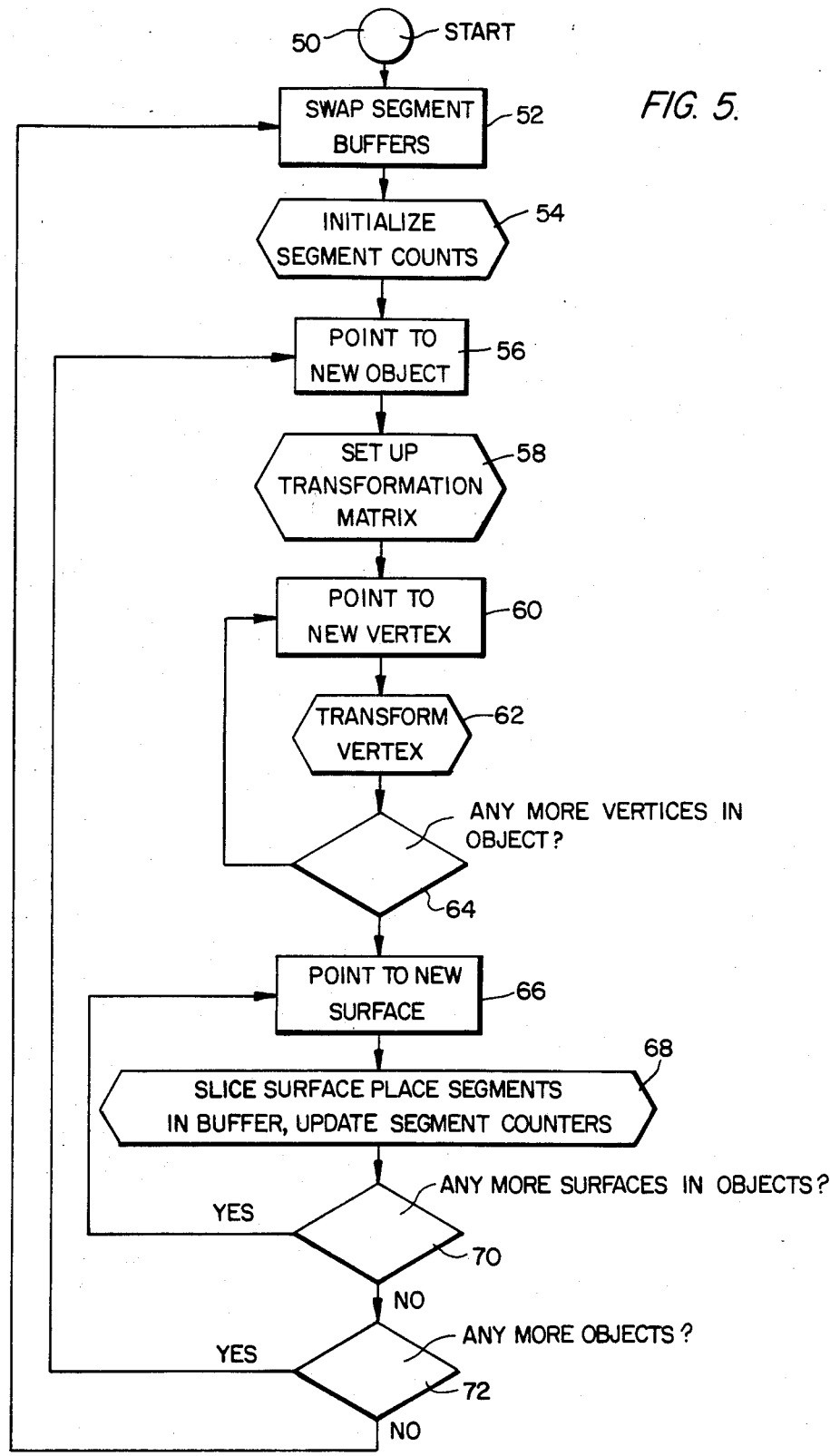
FIG. 5 is a flowchart of the process for generating the information stored in the memory of FIG. 4(a).

FIG. 5 illustrates a flowchart of a suitable computer program for generating the segment data illustrated in FIGS. 4(a) and 4(b). The program proceeds from starting point 50 to point 52 where the halves of the dual port memory 24 being loaded with data in accordance with FIGS. 4(a) and 4(b) are swapped. The computer maintains a list of segment counts, one per line, specifying the number of segments on a scan line. The program proceeds from point 52 to point 54 where the segment counts are all initialized. In the preferred embodiment illustrated in FIGS. 9–19, a total of 32 possible segments of information are storable per line of scanning. A greater or lesser number of segments may be used in practicing the invention. The program proceeds from point 54 to point 56 where a new object of the scene to be perspectively generated is identified which has been previously stored in the computer memory 22. The computer 22 uses an object pointer to identify the objects contained within the scene which varies from 1 to n where n is the total number of objects within the scene. While the object of FIG. 1 is a simple cube, it should be understood that the scene to be perspectively illustrated on the video monitor 25 typically includes a plurality of three-dimensional objects. The program proceeds from point 56 to point 58 wherein a transformation matrix is set up for calculation by the computer 22. The implementation of transformation matrices is well known and is described in the aforementioned "Tutorial: Computer Graphics", supra, and "Fundamentals of Interactive Computer Graphics". The program proceeds from point 58 to point 60 where a new vertex is pointed to for the object being processed. With reference to the cube of FIG. 1, a total of eight vertices are present. Accordingly, for the cube of FIG. 1, the computer 22 maintains a vertex pointer which varies from 1 to 8. The program proceeds from point 62 to decision point 64 where a decision is made if there are any more vertices in the object being processed from a determination of whether the count of the number of vertices has reached the total number of vertices in the object. If the answer is "yes" that there are more vertices in the object to be processed, the program repeatedly loops back to point 60 to complete the transformation of each vertex. If the answer is "no" at decision point 64, the program proceeds to point 66 where a new surface is pointed to in the object. From reference to FIG. 1, it is seen that the cube has a total of six surfaces so that the computer 22 would maintain a pointer varying from 1 to 6. The program proceeds from point 66 to point 68 where the surface being processed is sliced into segments such as A-D of FIG. 3 for storage in the dual port memory. The slicing of the surface into segments is in accordance with mathematical techniques known in the prior art such as those described in the "Tutorial: Computer Graphics", supra, "Fundamentals of Computer Graphics", supra, and U.S. Pat. No. 3,736,564. The identification of segments by the beginning and end point intersections of a face of an object with a line of scanning does not form part of the present invention. The program proceeds from point 68 to decision point 70 where a determination is made if there are any more surfaces in the object to be sliced. If the answer is "yes", the program loops back to point 66 to continue the processing until all surfaces of the object have been sliced and placed into the dual port memory 24 in accordance with FIGS. 4(a) and 4(b) as discussed above. If the answer is "no" at decision point 70, the program proceeds to decision point 72 to determine if there are any more objects to be processed. If the answer is "yes", the program loops back to point 56 where the pointer is incremented by one to point to a new object. The program will continue in the aforementioned loop between points 58 and 72 until all objects of the scene have been processed. If the answer is "no" at decision point 72, the program loops back to point 52 where the section of the dual port memory 24 being loaded with the segment information described, supra, with regard to FIGS. 4(a) and 4(b) is swapped to permit the loading of the previously read out half for read out by the raster processor 26.

Figure 6:
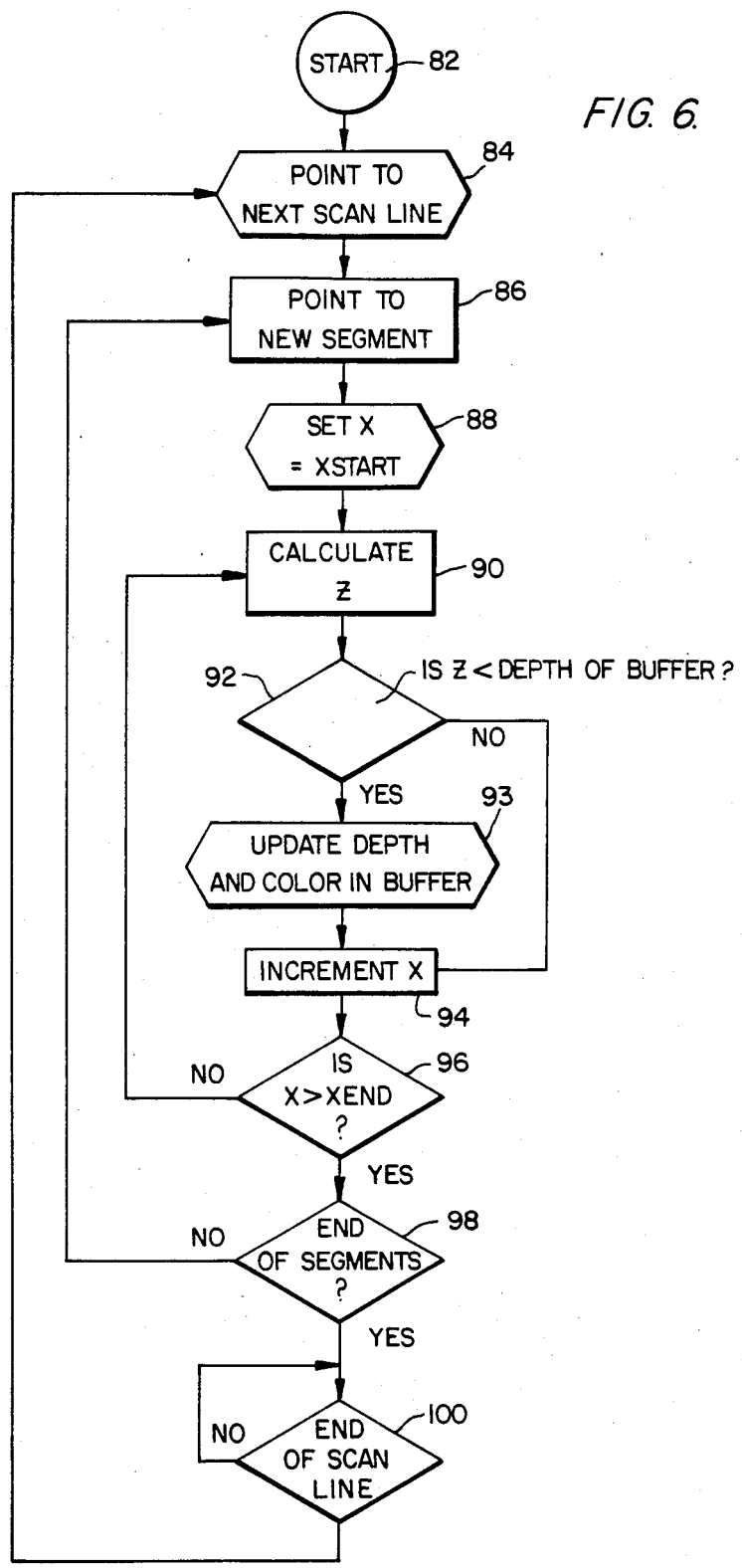
FIG. 6 is a flowchart of the process performed by the raster processor of FIG. 2.
Figure 9:
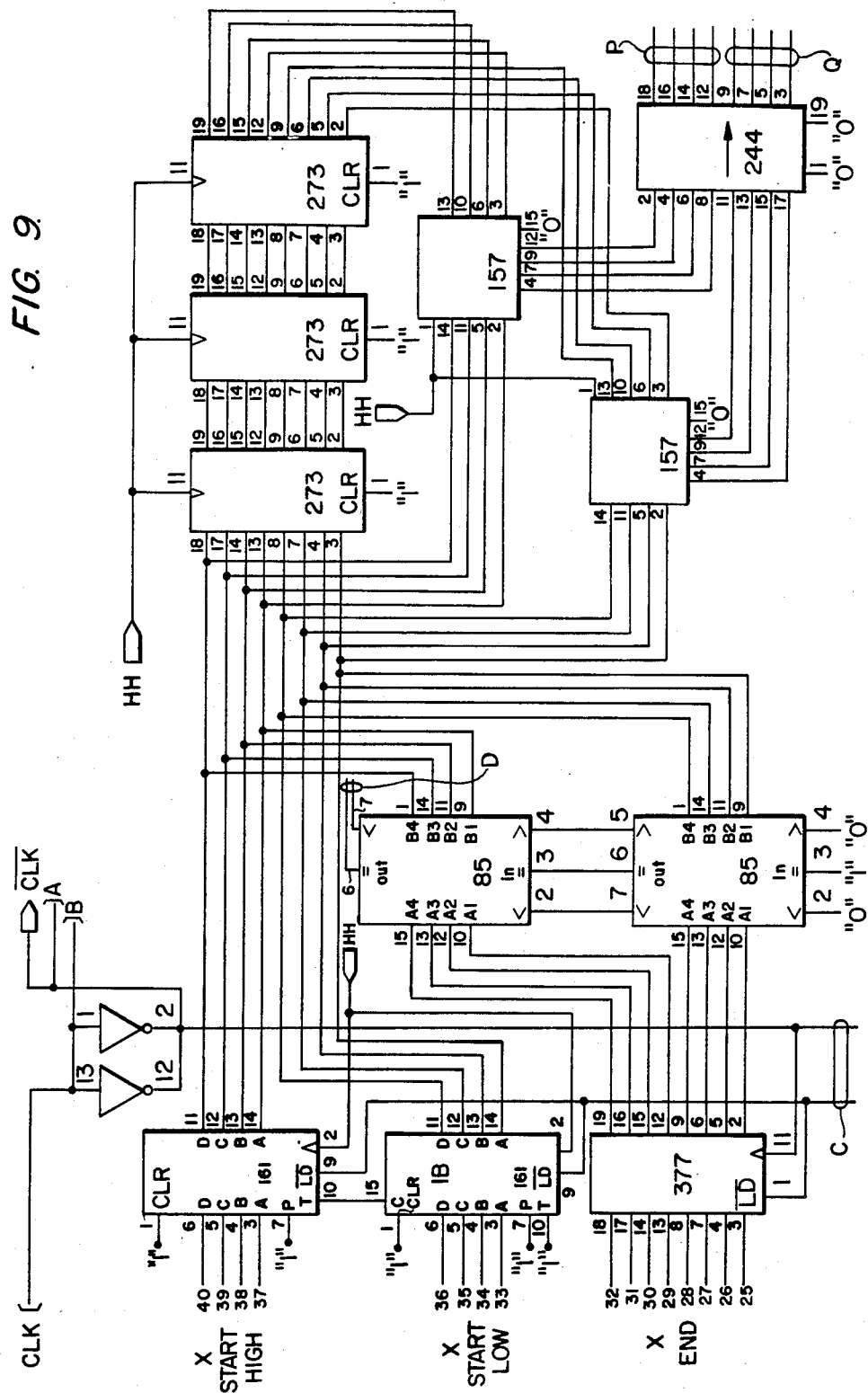
FIGS. 9, 10, 11, 12, 13, 14, 15, 16, 17, 18 and 19 illustrate the preferred hardware implementation of the raster processor, depth buffers and video processor of the system of FIG. 2.
Figure 10:
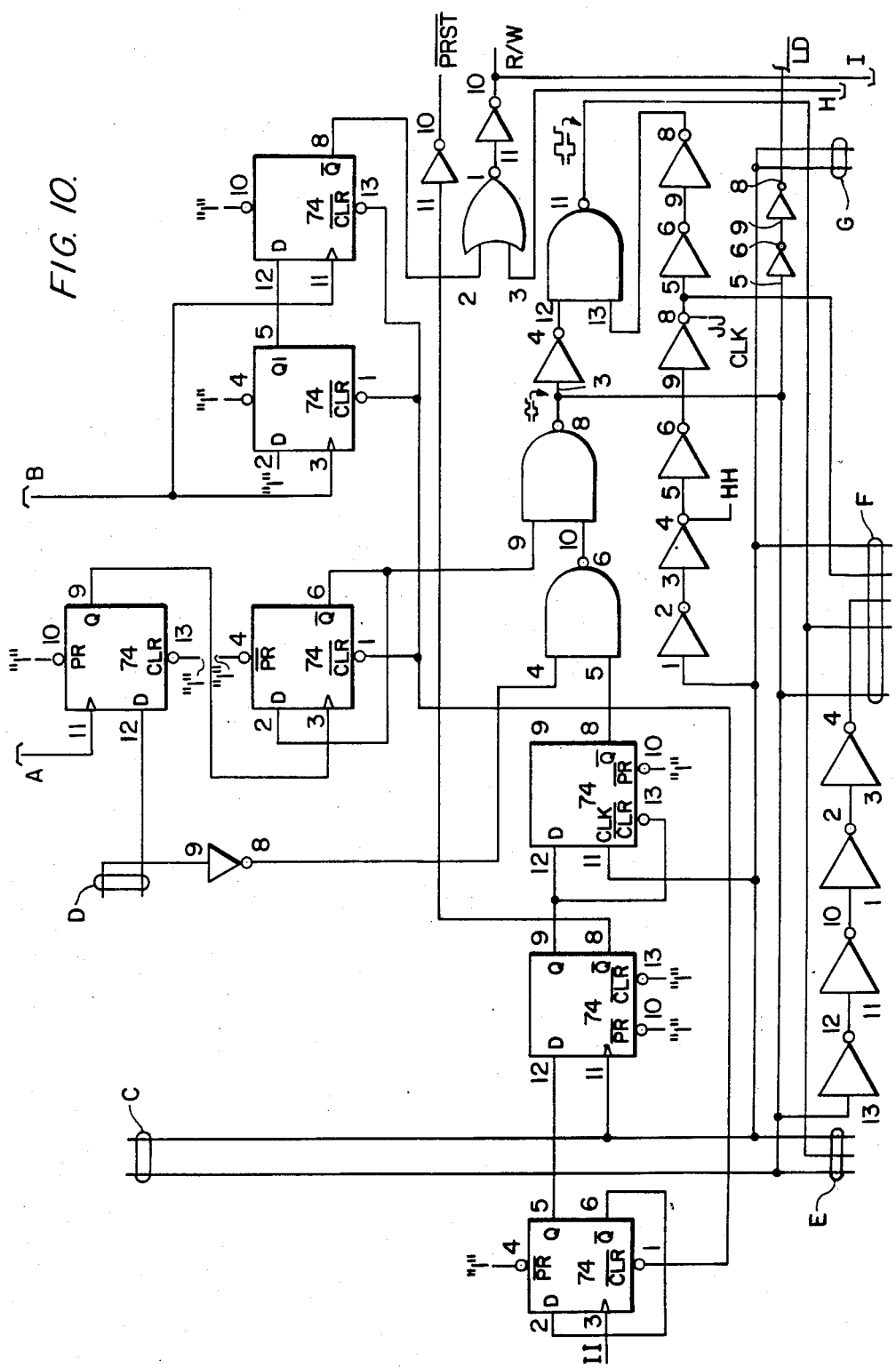
Figure 11:
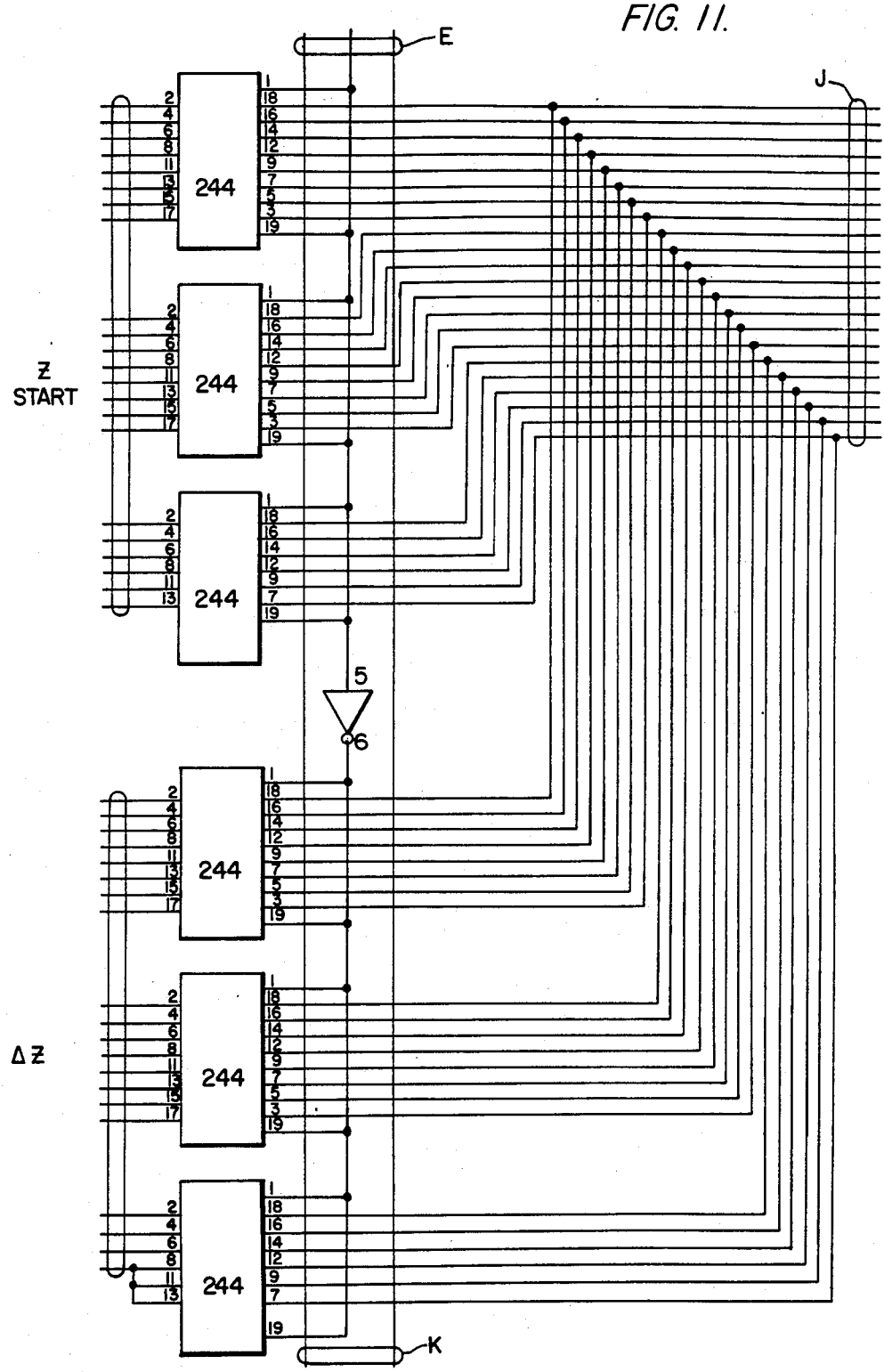

In the preferred embodiment of the invention, the raster processor is implemented in hardware to perform a hidden surface removal algorithm at high speed in accordance with the flowchart of FIG. 6. The preferred hardware implementation of the raster processor is illustrated in FIGS. 9-14. The raster processor accepts the segment information stored in the dual port memory 24 in accordance with FIGS. 4(a) and 4(b) described, supra. The raster processor functions to store in either depth buffer 28 or 30 a single line of display information (color) to be displayed on video monitor 25 with a format in accordance with FIG. 4(b). As explained above, the depth buffers 28 and 30 have a number of addressable storage locations which is equal to the number of pixels assigned to each line of scanning in the system and are addressable by the corresponding address of the pixel of a segment along the line of scanning being processed. Thus, each pixel of a line of scanning has a corresponding storage location in the depth buffer 28 or 30 which at the time of display by the video monitor 25 stores, inter alia, display information from part of the one or more objects which lies closest to the view reference plane or background information. The utilization of a depth buffer having storage locations equal to the number of pixels on a single line of scanning permits the usage of a high speed static random access memory while minimizing the overall requirement of memory necessary to implement the algorithm. The minimizing of the size of memory for the depth buffers 28 and 30 enhances the access time.

The depth buffer algorithm may be summarized as follows. The raster processor 26 calculates the depth for each of the pixels along the segment of the line of scanning that it is processing. As the depth of each pixel is calculated, the processor compares the calculated depth value with the depth value stored in the depth buffer at the pixel's address position along the x axis of scanning. If the depth value in the buffer is smaller than the pixel's depth value, no further operations are performed. However, if the pixel's depth value is smaller than the stored depth value, meaning that it lies closer to the view reference plane than the stored value, the pixel's display information (color) and depth value are placed into the addressed location buffer.

FIG. 6 illustrates a flowchart of the depth buffer algorithm implemented in the hardware of FIGS. 9-14. The algorithm proceeds from starting point 82 to point 84 where the line to be scanned is addressed. The addressing of the lines to be scanned is along the y axis and corresponds to the y values illustrated in the memory map of the dual port memory 24 as described above with reference to FIG. 4(a). At the beginning of the algorithm, the address for the line to be scanned is set at one which starts processing on the uppermost line to be displayed on video monitor 25. Each successive scanning line is located farther down the screen of the video monitor 25. The algorithm proceeds from point 84 to point 86 were a new segment is addressed. Pointing to a new segment is the identification of the particular segment 1 to n to be processed along the line of scanning as illustrated in FIG. 4(a). At the start of the processing of each line of scanning at point 86, the segment pointer is set to one to access the first segment stored for the addressed line to be processed. The algorithm proceeds to point 88 wherein the first pixel within the segment being processed is addressed by setting the address "x" $\times$ x start. The x start address is obtained from the 1st through 8th bits of each segment word as described above in FIG. 4(b). The algorithm proceeds to decision point 90 where the addressed pixel's depth is calculated from the information stored in the segment memory of FIG. 4(a) from the 20-bit field which stores the depth of the first cell in the segment being processed and the 20-bit field of ΔZ. The depth of the first pixel is available directly from the 17th–36th bits of the segment word. The depth of each succeeding pixel is calculated by the addition of the quantity ΔZ to the stored depth contained in the floating point adder of FIG. 12 which is the "TDC 1022" integrated circuit having the "J" signal inputs to the left thereof. The depth of the previous pixel is stored in one of the two registers in the floating point adder which facilitates the calculation of the depth of the current pixel by the single operation of the addition of the quantity ΔZ. The algorithm proceeds to decision point 92 where a depth comparison of the addressed pixel is made with the depth information stored in the storage location in the depth buffer having the same x address to determine if that pixel lies closer to the view reference plane than the information stored in the addressed location of the depth buffer. The depth comparison of the stored depth in the addressed storage location of the depth buffer with the calculated depth is performed by the floating point adder of FIG. 12 which is the "TDC 1022" integrated circuit located to the right of the previously referenced floating point adder. The actual comparison is made with the respective stored depth and calculated depth. When the calculated depth is less than stored depth, the pixel of the segment being processed is closer to the view reference plane. The comparison of depth values is accomplished at high speed because it requires a single subtraction operation. If the answer is "yes" at decision point 92, the algorithm proceeds to point 93 wherein the addressed location of the depth buffer is updated with the depth information and depth of the pixel which was determined to lie closer to the view reference plane than the information currently stored in the depth buffer. The algorithm proceeds to point 94 wherein the address of the pixel within the segment being processed is incremented by one to address the next pixel in the segment. If the answer is "no" at decision point 92, the algorithm proceeds directly from decision point 92 to point 94 wherein the aforementioned incrementing of the address occurs. The algorithm proceeds from point 94 to decision point 96 where a determination is made if the new x address is greater than the x address of the ending pixel in the segment being processed. The ending address of the segment being processed is determined from the 9th through 16th bits of the segment bit word described above with reference to FIG. 4(b). If the answer is "no" at decision point 96, the algorithm loops back to point 90 where the depth of the newly addressed pixel is stored. The algorithm then loops through the previously-described series of steps from point 90 to point 96 to complete the comparison of the processing of each of the pixels within the segment being processed. If the answer is "yes" at decision point 96, the algorithm proceeds to decision point 98 where a determination is made if the last segment in the line of segments has been processed. If the answer is "no", the algorithm loops back to point 86 where a new segment within the line of segments being processed is addressed. The algorithm then proceeds from point 86 through 98 until each of the pixels within each of the segments being processed is compared with the depth buffer to determine if those pixels should be stored in the depth buffer for display. If the answer is "yes" at decision point 98, the algorithm proceeds to decision point 100 where a determination is made if the end of a scanning line has been reached. The end of the scanning line is determined from the monitoring of the generation of horizontal sync pulses by the video monitor 25. If the answer is "yes" at decision point 100, the program loops back to point 84 wherein the scanning line pointer is incremented by one to start the processing of the next scanning line to be displayed by the video monitor 25. The aforementioned program steps continue for the processing of the plurality of scanning lines stored in the memory illustrated in FIG. 4(a) until the last scanning line has been reached. At that time, the other half of the dual port memory is addressed to begin the processing of the previously loaded segment data that has been stored therein while the currently just read out part of the dual port memory 24 is coupled to the computer 22 for the storage of the segment data, as illustrated in FIG. 4(a).

FIG. 7 illustrates a flowchart of the operation of the video processor 32 in the display of the display information stored in either the depth buffers 28 or 30 of a particular line to be displayed by the video monitor 25. The display process proceeds from starting point 110 to point 112 where the depth buffer 28 or 30 containing the depth information to be displayed by the video monitor 25 is switched to the read out port of the video processor 32. The display process proceeds to point 114 where the address of the pixel to be displayed is incremented by one to identify the next pixel to be displayed by the video monitor 25. The addressing of the pixels sequentially from the depth buffers 28 and 30 is controlled by timing signals produced by the video processor 32. The circuitry for the preferred embodiment of the video processor 32 including the generation of the necessary timing signals is illustrated in detail in FIGS. 17 and 19. The display process proceeds from point 114 to point 116 where the address pixel's color value is sent to the video monitor 25. The display process proceeds from point 116 to point 118 where background color and the maximum display depth is initiallized in the depth buffer location from which the pixel display information was just read. The initialization of the addressed storage location in the depth buffer 28 or 30 which has just been read insures that for the next line to be displayed, if there is no information at that pixel location of the scene to be displayed, the display of that location as background information. The program proceeds from point 118 to decision point 120 where a determination is made if the display is at the end of the scanning line. The ending of the scanning line is determined from timing signals provided by the video processor 32 and occurs after the last addressable location within the depth buffer 28 or 30 has been read out for display. If the answer is "yes" at decision point 120, the program proceeds back to point 112 where the buffers are switched. The display process then proceeds from steps 112 through steps 120 for the newly addressed depth buffer.

FIGS. 9–19 illustrate hardware for implementing the preferred embodiment of the present invention. As has been set forth, supra, the raster processor is implemented by the circuitry of FIGS. 9–14; the depth buffer 28 is implemented by the circuitry of FIGS. 15 and 18; the depth buffer 30 is implemented by the circuitry of FIGS. 16 and 18; and the video processor is implemented by the circuitry of FIGS. 17 and 19. The circuitry of FIGS. 9–19 will not be described in detail for the reason that a complete electrical schematic is illustrated therein as understood by persons skilled in the art. The type of integrated circuit used for each of the blocks is designated by its industry accepted number where applicable or by its manufacturer and part number. Each of the pin positions for each of the circuits contains a pin identification number used by the manufacturer for identifying that pin. A reference to electrical ground is identified by the notation "0". A reference to the power supply potential is identified by "1". References to data lines are identified by "D" with the number of the line following. References to address lines are identified by "A" with the number of the address line following.

While the invention has been described in terms of its preferred embodiment, modifications may be made thereto to process the segment information stored within the dual port memory 24 on a single line basis instead of a plurality of lines as illustrated in FIG. 4(a). Additionally, processing of the depth of the individual pixels of each segment may be performed on a real time basis to eliminate the requirement for storage of the detailed information of FIG. 4(b). While the preferred embodiment of the raster processor 26, depth buffers 28 and 30 and video processor 32 is in hardware to enhance the speed of operation, it should be clearly understood that part or all of the functions performed by the aforementioned elements may be implemented by software without departing from the scope of the invention.

It is intended that numerous additional modifications may be made to the preferred embodiment as described above without departing from the spirit and scope of the invention. It is intended that all such modifications fall within the scope of the appended claims.

I claim:

1. A process for generating and displaying perspective images, without hidden surfaces on a view reference plane on a display device for scanning a plurality of scanning lines in a raster with each line having a plurality of addressable pixels, of a scene having one or more three-dimensional objects in which each object has one or more planar surfaces comprising:

(a) storing the one or more objects to be displayed as a three-dimensional mathematical representation;

(b) processing the three-dimensional mathematical representation of the one or more objects to generate a list of line segments along the direction of scanning of the intersection of the scanning lines in the view reference plane with the one or more surfaces of the one or more objects with line segments from each line of scanning being stored in a separate line storage location which is addressed by the line from which the line segments were generated, each stored line segment including display information for each of the pixels therein, information enabling the identification of beginning and end pixels of its intersection along the line of scanning and information permitting the calculation of the depth of each pixel therein with respect to the view reference plane;

(c) initializing addressable storage locations in a depth buffer having a number of addressable storage locations equal in number to the number of pixels along a line of scanning with background depth information and background display information, each storage location having an address corresponding to one of the pixels along a line of scanning;

(d) processing sequentially in time the line storage locations in the order of scanning on the display device, each line storage location being individually processed to calculate for each pixel within each line segment stored therein its depth with respect to the view reference plane;

(e) comparing sequentially in time the calculated depth information of each line storage location with depth information stored in the depth buffer in the order of scanning on the display device, the calculated depth information of each line storage location being processed by comparing the calculated depth of each pixel within each line segment with depth information stored in the depth buffer at the corresponding address;

(f) storing calculated depth information and display information in the storage locations of the depth buffer sequentially in time for each of the line storage locations in the order of scanning on the display device, the calculated depth information and display information of each of the pixels of the line segments of each line storage location being stored in the depth buffer at the corresponding address when during the comparing the calculated depth information is determined to be closer to the view reference plane than the depth information stored at the corresponding address of the depth buffer to generate a line of display information; and (g) displaying the display information stored within the addressable storage locations of the depth buffer sequentially in time on a line by line basis.

2. A process in accordance with claim 1 wherein the information stored for each line segment includes the address along the line of scanning of the beginning and end pixel within the line segment, information which is a function of the depth of the beginning pixel within the line segment with respect to the view reference plane and the rate of change perpendicular to the view reference plane of the depth between the beginning and ending pixels within the line segment.

3. A process in accordance with claim 2 wherein the information which is a function of the depth of the beginning pixel is the depth of the beginning pixel and the information on the rate of change is $\Delta Z$ wherein $$\Delta Z = (Z\text{ end} - Z\text{ start})/n$$

in which the Z start is the depth of the beginning pixel; Z end is the depth of the end pixel and n is the number of pixels in the line segment.

4. A process in accordance with claim 3 wherein the depth of each pixel for each line segment is calculated by addition of the quantity $\Delta Z$ to the depth of the preceding pixel and the depth of the first pixel is determined from stored information regarding the segment.

5. A system for generating and displaying images, without hidden surfaces in a view reference plane on a display device by scanning a plurality of scanning lines in a raster with each line having a plurality of addressable pixels, of a scene having one or more three-dimensional objects in which each object has one or more planar surface comprising:

(a) means for storing the one or more objects to be displayed as a three-dimensional mathematical representation;

(b) means for processing the three-dimensional mathematical representation of the one or more objects to generate a list of line segments along the direction of scanning of the scanning lines of the intersection of the scanning lines in the view reference plane with the one or more surfaces of the one or more objects;

(c) means for storing the list of line segments for each of the plurality of scanning lines with line segments for each line of scanning being stored in a separate line storage location, each stored line segment containing display information for each of the pixels therein, information enabling the identification of the beginning and end pixels of its intersection along the line to be scanned, and information permitting the calculation of the depth of each pixel therein with respect to the view reference plane;

(d) depth buffer means, having a number of addressable storage locations equal to the number of pixels in a line of scanning with each storage location having an address corresponding to one of the pixels along the line of scanning for storing display information and depth information of pixels of the one or more objects to be displayed, and for initially storing in each of the storage locations background display information and background depth information, the background display information to be displayed when a surface of the one or more objects is not present along the line to be scanned;

(e) means for processing sequentially in time the line storage locations in the order of scanning on the display device, each line storage location being individually processed to calculate for each pixel within each line segment stored therein its depth with respect to the view reference plane;

(f) means for comparing sequentially in time the calculated depth information of each line storage location with depth information stored in the depth buffer in the order of scanning on the display device, the calculated depth information for each line segment being processed by comparing the calculated depth for each pixel within each line segment with depth information stored in the depth buffer at the corresponding address, the calculated depth information and display information of each of the pixels of the line segments of each line storage location being stored in the depth buffer at the corresponding address when during the comparing the calculated depth information is determined to be closer to the view reference plane than the depth information stored at the corresponding address of the depth buffer to generate a line of display information; and (g) means for displaying the display information stored within the addressable storage locations of the depth buffer sequentially in time on a line by line basis.

6. A system in accordance with claim 5 wherein each line segment includes the address along the line of scanning of the beginning and end pixels within the line segment with respect to the view reference plane and the rate of change perpendicular to the view reference plane of the depth between the beginning and ending pixels within the line segment.

7. A system in accordance with claim 6 wherein the information stored in a line segment which is a function of the depth of the beginning pixel is the depth of the beginning pixel and the information of the rate of change is the quantity $\Delta Z$ wherein $\Delta Z = (Z\ end - Z\ start)/n$ in which Z start is the depth of the beginning pixel; Z end is the depth of the end pixel and n is the number of pixels in the line segment.

8. A system in accordance with claim 7 wherein the depth of each pixel is calculated by the means for processing by addition of the quantity $\Delta Z$ to the depth of the preceding pixel and the depth of the first pixel is determined from information stored regarding the first pixel.

9. A system for generating and displaying perspective images, without hidden surfaces in a view reference plane on a display device by scanning a raster of a plurality of scanning lines each having a plurality of pixels of a scene having one or more three-dimensional objects in which each object has one or more planar surfaces comprising:

(a) depth buffer means, having a number of addressable storage locations equal to the number of pixels in a line of scanning with each storage location having an address corresponding to one of the pixels along the line of scanning for storing display information and depth information of pixels of the one or more objects to be displayed, and for initially storing in each of the storage locations background display information and background depth information, the background display information to be displayed when a surface of the one or more objects is not present along the line to be scanned;

(b) means for generating a list of line segments along the direction of scanning of the lines of scanning of the raster of the intersection of the scanning lines in the view reference plane with the one or more surfaces of the one or more objects, each line segment including display information for each of the pixels therein, information enabling identification of the beginning and end pixels therein and information permitting the calculation of the depth of each pixel therein;

(c) means for storing the list of line segments for each of the plurality of scanning lines with line segments for each line of scanning being stored in a separate line storage location which is addressed by a line of scanning from which the line segments were generated;

(d) means for calculating the depth of each pixel within each line segment of a currently processed line storage location;

(e) means for sequentially coupling, in the order of scanning of the lines of scanning of the raster, the line storage locations to the means for calculating to provide information stored within the line segments of each line storage location to cause the means for calculating to process the pixels within each line segment of the line storage location;

(f) means for comparing the calculated depth of each pixel of each line segment within the currently processed line storage location with the depth information stored in the depth buffer means having the corresponding address and storing the depth and display information of each pixel at the corresponding address in the depth buffer means when during the comparing the calculated depth of the pixel lies closer to the view reference plane than the depth information stored at a corresponding address of the depth buffer means to generate a line of display information after all of the pixels within the line storage location have been processed; and (g) means for causing the sequential display on the display device of the lines of display information stored in the depth buffer means.

10. A system in accordance with claim 9 wherein the display information of each pixel stored in the storage locations of the depth buffer is a color which is stored in the line segment which contained the pixel stored in the storage location.

11. A process for generating and displaying perspective images without hidden surfaces in a view reference plane on a display device by scanning a raster of a plurality of scanning lines each having a plurality of pixels of a scene having one or more three-dimensional objects in which each object has one or more planar surfaces comprising:
(a) generating a list of line segments by the processing of a three-dimensional mathematical representation of the one or more objects along the direction of scanning of each of the lines of scanning of the raster of the intersection of the scanning lines in the view reference plane with the one or more surfaces of the one or more objects with line segments from each line of scanning being stored in a separate line storage location which is addressed by the line from which the line segments were generated, each stored line segment including display information for each of the pixels therein, information enabling the identification of beginning and end pixels of its intersection along the line of scanning and information permitting the calculation of the depth of each pixel therein with respect to the view reference plane;
(b) processing sequentially the line storage locations in the order of scanning of the lines of scanning of the raster, each line storage location being processed as a current line storage location by calculating the depth of each pixel of each line segment therein;
(c) comparing the calculated depth for each pixel within the list of line segments of the current line storage location with depth information stored at a corresponding address in a depth buffer means, the depth buffer means having a plurality of addressable storage locations equal in number to the number of pixels along a line of scanning for storing display information and depth information for each pixel along the line of scanning to be displayed;
(d) storing the display information and depth information of each pixel within the depth buffer means at the corresponding address of the depth buffer means when during the comparing the calculated depth of the pixel lies closer to the view reference plane than the depth information stored at the corresponding address of the depth buffer means to generate a line of display information; and
(e) displaying sequentially the display information stored by the depth buffer means generated by the processing of each of the line storage locations.

12. In a system for generating and displaying perspective images without hidden surfaces in a view reference plane on a display device, by scanning a raster having a plurality of scanning lines with each scanning line having a plurality of pixels, of a scene having one or more three-dimensional objects with each object having one or more planar surfaces in which hidden surfaces are removed by processing scanning lines to generate line segments of the intersection the planar surfaces therewith in which line segments are processed to compare a calculated depth of each pixel with depth of a pixel stored in a corresponding addressed storage location in a depth buffer means and causing the storage of the calculated depth of the pixel in the corresponding addressed storage location of the depth buffer means when the calculated depth of the pixel lies closer to the view reference plane than the depth of the pixel stored at the corresponding location; the improvement comprising:
(a) means for generating a list of the line segments for each of the lines of scanning of the raster, line segments from each of the lines of scanning being stored in a separate line storage location which is addressed by the line of scanning from which the line segments were generated; and
(b) means for causing the line storage locations of each of the lines of scanning to be processed in the order of scanning of the lines of the raster on the display device by the depth buffer means to generate a raster of display information.

13. A system for displaying perspective images from scenes, having one or more three-dimensional objects in which each object has one or more surfaces, on a view reference plane of a display device by scanning a raster comprised of a plurality of parallel scanning lines across the view reference plane with each line having a plurality of addressable pixels comprising:
(a) a line segment processing means for processing a three-dimensional mathematical representation of the one or more objects of the scene to be displayed to provide for each line of scanning within the raster a list of line segments of the intersection of each of the surfaces therewith;
(b) a line segment memory coupled to the segment processing means for storing the list of line segments from each line of scanning in a separate line storage location, each line storage location being addressable by the line of scanning from which the line segments were provided by the line segment processing means, each line segment having one or more pixels and being stored as information enabling the determination of depth information and display information of each pixel within each stored line segment;
(c) a depth buffer means having a number of addressable storage locations equal in number to the number of pixels along a single line of scanning, each storage location storing display information and depth information for a single pixel with each storage location having an address corresponding to a separate one of the pixels in a line of scanning of the display device, each storage location of the depth buffer means being initially loaded with background depth information and background display information;
(d) a raster processing means coupled to the depth buffer means and the line segment memory for sequentially processing in time the line storage locations in the order of scanning on the display device and from each line storage location processing the line segments within the list of stored line segments to calculate the depth of each pixel within each stored line segment and causing storage in the depth buffer means of the display information and depth information for each pixel which has a calculated depth with respect to the view reference plane which is less than the depth information stored in the depth buffer means at the corresponding address; and (e) a video processing means coupled to the depth buffer means for storing the display information stored within the depth buffer means for each line of scanning after the processing of the pixels within the list of line segments is complete.

14. A system in accordance with claim 13 wherein the information enabling the determination of depth information and display information of each pixel within each stored line segment comprises information enabling the identification of the beginning and end pixels of the intersection of each line segment and information enabling the calculation of the depth of each pixel within each line segment with respect to the view reference plane.

15. A system in accordance with claim 13 wherein the raster is a field of information with every other line of scanning being skipped during scanning with successive fields being interlaced.

16. A system in accordance with claim 13 wherein the line segment processing means comprises:

(a) means for identifying sequentially objects comprising the scene which have not had their one or more surfaces processed to compute the line segments of the object which intersect the lines of scanning and for computing the line segments of each identified object which intersect the lines of scanning; and (b) means for causing the storage of the information enabling the determination of the depth information and display information for each pixel within each line segment in the line storage location in the line segment memory for storing line segments from the line of scanning from which the line segment was provided.

17. A system in accordance with claim 16 wherein the means for identifying and for computing further comprises:

(a) a surface pointing means for sequentially pointing to each of the one or more surfaces which comprise the object; and wherein (b) the computing of line segments is processed by the line segment processing means by calculating for each surface each line segment intersecting the lines of scanning within the raster and each line segment is caused to be stored by the line segment processing means in the line storage location in the line segment memory for storing line segments from the line of scanning from which the line segment was provided.

18. A system in accordance with claim 13 wherein each line storage location has a plurality of contiguous storage locations for storing said information.

19. A system in accordance with claim 18 wherein each line storage location contains a capacity for storing a fixed number of line segments.

20. A system for displaying perspective images from scenes having one or more three-dimensional objects in which each object has one or more surfaces on a view reference plane of a display device by scanning a raster comprised of a plurality of parallel scanning lines across the view reference plane with each line having a plurality of addressable pixels comprising:

(a) a line segment processing means for processing a three-dimensional mathematical representation of the one or more objects of the scene to be displayed to provide for each line of scanning, chosen from evenly spaced locations within the raster, a list of line segments of the intersection of each of the surfaces therewith;

(b) a line segment memory coupled to the line segment processing means for storing the list of line segments from each line of scanning chosen from the evenly spaced locations within the raster with a separate line storage location being provided for each evenly spaced location, each line storage location being addressable by the line of scanning from which the line segments were provided by the line segment segment processing means, each line segment having one or more pixels and being stored as information enabling the determination of depth information and display information of each pixel within each stored line segment;

(c) a depth buffer means having a number of addressable storage locations equal in number to the number of pixels along a single line of scanning, each storage location storing display information and depth information for a single pixel with each storage location having an address corresponding to a separate one of the pixels in a line of scanning of the display device, each storage location of the depth buffer means being initially loaded with background depth information and background display information;

(d) a raster processing means coupled to the depth buffer means and the line segment memory for sequentially processing in time the line storage locations in the order of scanning on the display device and from each line storage location processing the list of line segments to calculate the depth of each pixel within each line segment and causing the storage in the depth buffer means the display information and depth information for each pixel which has a calculated depth with respect to the view reference plane which is less than the depth information in the depth buffer means which is stored at the corresponding address; and (e) a video processing means coupled to the depth buffer means for storing the display information stored within the depth buffer means for each line of scanning after the processing of the pixels within the list of line segments is complete.

21. A system in accordance with claim 20 wherein the information enabling the determination of depth information and display information of each pixel within each stored line segment comprises information enabling the identification of the beginning and end pixels of the intersection of each line segment and information enabling the calculation of the depth of each pixel within each line segment with respect to the view reference plane.

22. A system in accordance with claim 20 wherein the raster is a field of information with every other line of scanning being skipped during scanning with successive fields being interlaced.

23. A system in accordance with claim 20 wherein the line segment processing means comprises:

(a) means for identifying sequentially objects comprising the scene which have not had the one or more surfaces processed to compute the line segments of the object which intersect the lines of scanning and for computing the line segments of each identified object which intersect the lines of scanning; and (b) means for causing the storage of the information enabling the determination of the depth information and display information for each pixel within each line segment in the line storage location in the line segment memory for storing line segments from the line of scanning from which the line segment was provided.

24. A system in accordance with claim 23 wherein the means for identifying and for computing further comprises:
(a) a surface pointing means for sequentially pointing to each of the one or more surfaces which comprise the object; and wherein
(b) the computing of line segment is processed by the line segment processing means by calculating for each surface each line segment intersecting the lines of scanning within the raster and each line segment is caused to be stored by the line segment processing means in the line storage location in the line segment memory for storing line segments from the line of scanning from which the line segment was provided.

25. A system in accordance with claim 24 wherein each line storage location has a plurality of contiguous storage locations for storing the information of each segment.

26. A system in accordance with claim 25 wherein each line storage location contains a capacity for storing a fixed number of line segments.

27. A system for displaying perspective images from scenes, having one or more three-dimensional objects in which each object has one or more surfaces, on a view reference plane of a display device by scanning a raster comprised of a plurality of parallel scanning lines across the view reference plane with each line having a plurality of addressable pixels comprising:
(a) a line segment processing means for processing a three-dimensional mathematical representation of the one or more objects of the scene to be displayed to provide for each line of scanning within the raster a list of line segments of the intersection of each of the surfaces therewith;
(b) a line segment memory coupled to the processing means for storing the list of line segments from each line of scanning in a separate line storage location, each line storage location being addressable by the line of scanning from which the line segments were provided by the line segment processing means, each line segment having one or more pixels and being stored as information enabling the determination of depth information and display information of each pixel within each stored line segment;
(c) first and second depth buffer means, each depth buffer means having a number of addressable storage locations equal in number to the number of pixels along a single line of scanning, each storage location storing display information and depth information for a single pixel with each storage location having an address corresponding to a separate one of the pixels in a line of scanning of the display device, each storage location of the depth buffer means being initially loaded with background depth information and background display information;
(d) a raster processing means coupled to the first and second depth buffer means and the line segment memory for sequentially processing in time the line storage locations in the order of scanning on the display device and from each line storage location processing the list of line segments to calculate the depth of each pixel within each line segment and causing the storage in one of the depth buffer means the display information and depth information for each pixel which has a depth with respect to the view reference plane which is less than the depth information in the depth buffer means which is stored at the corresponding address;
(e) a video processing means coupled to the depth buffer means for storing the display information stored within the depth buffer means for each line of scanning after the processing of the pixels within the list of line segments is complete; and
(f) means for controlling the raster processing means and the video processing means to cause, during the processing of each line storage location, one of the depth buffer means to function to be loaded with display information provided from the raster processing means while the other depth buffer means functions to cause display information stored in the other depth buffer means to be read out to the video processing means, the means for controlling causing the functions of the depth means to alternate for each line being scanned.

28. A system for displaying perspective images from scenes, having one or more three-dimensional objects in which each object has one or more surfaces, on a view reference plane of a display device by scanning a raster comprised of a plurality of parallel scanning lines across the view reference plane with each line having a plurality of addressable pixels comprising:
(a) a line segment processing means for processing a three-dimensional mathematical representation of the one or more objects of the scene to be displayed to provide for each line of scanning chosen from evenly spaced locations within the raster a list of line segments of the intersection of each of the surfaces therewith;
(b) a line segment memory coupled to the processing means for storing the list of line segments from each line of scanning chosen from evenly spaced locations in a separate line storage location, each line storage location being addressable by the line of scanning from which the line segments were provided by the line segment processing means, each line segment having one or more pixels and being stored as information enabling the determination of depth information and display information of each pixel within each stored line segment;
(c) first and second depth buffer means, each depth buffer means having a number of addressable storage locations equal in number to the number of pixels along a single line of scanning, each storage location storing display information and depth information for a single pixel with each storage location having an address corresponding to a separate one of the pixels in a line of scanning of the display device, each storage location of the depth buffer means being initially loaded with background depth and background display information;
(d) a raster processing means coupled to the first and second depth buffer means and the line segment memory for sequentially processing in time the line storage locations in the order of scanning of the display device and from each line storage location processing the list of line segments to calculate the depth of each pixel within each line segment and causing the storage in one of the depth buffer means the display information and depth information for each pixel which has a depth with respect to the view reference plane which is less than the depth information in the depth buffer means which is stored at the corresponding address;

(e) video processing means coupled to the depth buffer means for storing the display information stored within the depth buffer means for each line of scanning after the processing of the pixels within the list of line segments is complete; and (f) means for controlling the raster processing means and the video processing means to cause, during the processing of each line storage location, one of the depth buffer means to function to be loaded with display information provided from the raster processing means while the other depth buffer means functions to cause display information stored in the other depth buffer means to be read out to the video processing means, the means for controlling causing the functions of the depth buffer means to alternate for each line being scanned.

29. A process for generating and displaying perspective images without hidden surfaces on a view reference plane on a display device by scanning a plurality of scanning lines in a raster with each line having a plurality of addressable pixels of a scene having one or more three-dimensional objects in which each object has one or more planar surfaces comprising:

(a) storing the one or more objects to be displayed as a three-dimensional mathematical representation;

(b) processing the three-dimensional mathematical representation of the one or more objects to generate a list of line segments along the direction of scanning of the intersection of the scanning lines in the view reference plane with the one or more surfaces of the one or more objects with line segments from each line of scanning being stored in a separate line storage location which is addressed by the line from which the line segments were generated, each line segment having stored therein display information and depth information which is a function of the display and depth information of the individual pixels therein;

(c) initializing addressable storage locations in a depth buffer means having a number of addressable storage locations equal in number to the number of pixels along a line of scanning with background depth information and background display information, each storage location having an address corresponding to one of the pixels along a line of scanning;

(d) processing sequentially in time the line segment storage locations, each line storage location being individually processed to calculate for each pixel within each line segment stored therein its depth with respect to the view reference plane;

(e) comparing sequentially in time the calculated depth information for each line storage location with depth information stored in the depth buffer means in the order of scanning on the display device, the calculated depth information for each line storage location being processed by comparing the calculated depth for each pixel within each line segment with depth information stored in the depth buffer means at the corresponding address;

(f) storing calculated depth information and display information in the storage locations of the depth buffer means sequentially in time for each of the line storage locations, the calculated depth information and display information of each of the pixels of the line segments of each line storage location being stored in the depth buffer means at the corresponding address when the calculated depth information is closer to the view reference plane than the depth information stored at the corresponding address of the depth buffer means to generate a line of display information; and (g) displaying the display information stored within the addressable storage locations of the depth buffer means sequentially in time on a line by line basis.

30. A system for generating and displaying perspective images without hidden surfaces in a view reference plane on a display device by scanning a plurality of scanning lines in a raster with each line having a plurality of addressable pixels of a scene having one or more three-dimensional objects in which each object has one or more planar surfaces comprising:

(a) means for storing the one or more objects to be displayed as a three-dimensional mathematical representation;

(b) means for processing the three-dimensional mathematical representation of the one or more objects to generate a list of line segments along the direction of scanning of the scanning lines of the intersection of the scanning lines in the view reference plane with the one or more surfaces of the one or more objects;

(c) means for storing the list of line segments for each of the plurality of scanning lines with line segments from each line of scanning being stored in a separate line storage location, each line segment having stored therein display information and depth information which is a function of the display and depth information of the individual pixels therein;

(d) depth buffer means, having a number of addressable storage locations equal to the number of pixels in a line of scanning with each location having an address corresponding to one of the pixels along the line of scanning, for storing display information and depth information of pixels of the one or more objects to be displayed, and for initially storing in each of the storage locations background display information and background depth information, the background display information to be displayed when a surface of the one or more objects is not present along the line to be scanned;

(e) means for processing sequentially in time the line storage locations, each line storage location being individually processed to calculate for each pixel within each line segment stored therein its depth with respect to the view reference plane;

(f) means for comparing sequentially in time the calculated depth information for each line storage location with depth information stored in the depth buffer means, the calculated depth information for each line storage location being processed by comparing the calculated depth for each pixel within each line segment with depth information stored in the depth buffer means at the corresponding address and for storing calculated depth information and display information in the storage locations of the depth buffer means sequentially in time for each of the line storage locations in the order of scanning on the display device, the calculated depth information and display information of each of the pixels of the line segments of each line storage location being stored in the depth buffer means at the corresponding address when the comparison reveals that calculated depth information is closer to the view reference plane than the depth information stored at the corresponding address of the depth buffer means to generate a line of display information; and;

(g) means for displaying the display information stored within the addressable storage locations of the depth buffer means sequentially in time on a line by line basis.

31. A system for generating and displaying perspective images without hidden surfaces in a view reference plane on a display device by scanning a raster of a plurality of scanning lines each having a plurality of pixels of a scene having one or more three-dimensional objects in which each object has one or more planar surfaces comprising:

(a) depth buffer means, having a number of addressable storage locations equal to the number of pixels in a line of scanning with each location having an address corresponding to one of the pixels along the line of scanning for storing display information and depth information of pixels of the one or more objects to be displayed, and for initially storing in each of the storage locations background display information and background depth information, the background display information to be displayed when a surface of the one or more objects is not present along the line to be scanned;

(b) means for generating a list of line segments along the direction of scanning of the lines of scanning of the raster of the intersection of the scanning lines with the view reference plane with the one or more surfaces of the one or more objects, each line segment including display information for each of the pixels therein, information enabling identification of the beginning and end pixels therein and information permitting the calculation of the depth of each pixel therein;

(c) means for storing the list of line segments for each of the plurality of scanning lines with line segments from each line of scanning being stored in a separate line storage location which is addressed by a line of scanning from which the line segments were generated, each line segment having stored therein display information and depth information which is a function of the display and depth information of the individual pixels therein;

(d) means for calculating the depth of each pixel within each line segment of a currently processed line storage location;

(e) means for sequentially coupling the line storage locations to the means for calculating to cause the means for calculating to process the pixels within each line segment of the line storage location coupled thereto;

(f) means for comparing the calculated depth for each pixel of each line segment within the currently processed line storage location with the depth information stored in the depth buffer means having the corresponding address and storing the depth information and display information of each pixel at the corresponding address when the calculated depth of the pixel lies closer to the view reference plane than the depth information stored at corresponding address of the depth buffer means to generate a line of display information after all of the pixels of the line segments within the line storage location have been processed; and (g) means for causing the sequential display on the display device of the lines of display information stored in the depth buffer means.

32. A process for generating and displaying perspective images without hidden surfaces in a view reference plane on a display device by scanning a raster of a plurality of scanning lines each having a plurality of pixels of a scene having one or more three-dimensional objects in which each object has one or more planar surfaces comprising:

(a) generating a list of line segments by the processing of a three-dimensional mathematical representation of the one or more objects along the direction of scanning of each of the lines of scanning of the raster of the intersection of the scanning lines in the view reference plane with the one or more surfaces of the one or more objects with line segments from each line of scanning being stored in a separate line storage location which is addressed by the line from which the line segments were generated, each line segment having stored therein display information and depth information which is a function of the display information and depth information of the individual pixels therein;

(b) processing sequentially the line storage locations, each line storage location being processed as a current line storage location by calculating the depth of each pixel of each line segment stored therein;

(c) comparing the calculated depth for each pixel within the list of line segments of the current line storage location with depth information stored in a depth buffer means, the depth buffer means having a plurality of addressable storage locations equal in number to the number of pixels along a line scanning for storing display information and depth information for each pixel along the line of scanning to be displayed;

(d) storing the display information and depth information of each pixel at the corresponding address of the depth buffer means when the calculated depth of the pixel lies closer to the view reference plane than the depth information stored at the corresponding address of the depth buffer means to generate a line of display information; and (e) displaying sequentially the display information stored by the depth buffer means generated by the processing of each of the line storage locations.

33. In a system for generating and displaying perspective images without hidden surfaces in a view reference plane on a display device, by scanning a raster having a plurality of scanning lines with each scanning line having a plurality of pixels, of a scene having one or more three-dimensional objects with each object having one or more planar surfaces in which hidden surfaces are removed by processing scanning lines to generate line segments of the intersection the planar surfaces therewith in which line segments are processed to compare a calculated depth of each pixel with a depth of a pixel stored in a corresponding addressed storage location in a depth buffer means and causing the storage of the calculated depth of the pixel in the corresponding addressed storage location of the depth buffer means when the calculated depth of the pixel lies closer to the view reference plane; the improvement comprising:
  (a) means for generating a list of the line segments for each of the lines of scanning of the raster, line segments from each of the lines of scanning being stored in a separate line storage location which is addressed by the line of scanning from which the line segments were generated; and
  (b) means for causing the line storage locations of each of the lines of scanning to be processed by the depth buffer means to generate a raster of display information.

34. A system for displaying perspective images from scenes, having one or more three-dimensional objects in which each object has one or more surfaces, on a view reference plane of a display device by scanning a raster comprised of a plurality of parallel scanning lines across the view reference plane with each line having a plurality of addressable pixels comprising:
  (a) a line segment processing means for processing a three-dimensional mathematical representation of the one or more objects of the scene to be displayed to provide for each line of scanning within the raster a list of line segments of the intersection of each of the surfaces therewith;
  (b) a line segment memory coupled to the processing means for storing the list of line segments from each line of scanning in a separate line storage location, each line storage location being addressable by the line of scanning from which the line segments were provided by the line segment processing means, each line segment having one or more pixels and being stored as information enabling the determination of depth information and display information of each pixel within each stored line segment;
  (c) a depth buffer means having a number of addressable storage locations equal in number to the number of pixels along a single line of scanning, each storage location storing display information and depth information for a single pixel with each storage location having an address corresponding to a separate one of the pixels in a line of scanning of the display device, each storage location of the depth buffer means being initially loaded with background depth and background display information;
  (d) a raster processing means coupled to the depth buffer means and the line segment memory for sequentially processing in time the line storage locations and from each line storage location processing the list of line segments to calculate the depth of each pixel within each line segment and causing the storage in the depth buffer means the display information and depth information for each pixel which has a depth with respect to the view reference plane which is less than the depth information in the depth buffer means which is stored at the corresponding address; and
  (e) a video processing means coupled to the depth buffer means for storing the display information stored within the depth buffer means for each line of scanning after the processing of the pixels within the list of line segments is complete.

35. A system for displaying perspective images from scenes having one or more three-dimensional objects in which each object has one or more surfaces on a view reference plane of a display device by scanning a raster comprised of a plurality of parallel scanning lines across the view reference plane with each line having a plurality of addressable pixels comprising:
  (a) a line segment processing means for processing a three-dimensional mathematical representation of the one or more objects of the scene to be displayed to provide for each line of scanning chosen from evenly spaced locations within the raster a list of line segments of the intersection of each of the surfaces therewith;
  (b) a line segment memory coupled to the processing means for storing the list of line segments from each line of scanning chosen from evenly spaced locations in a separate line storage location, each line storage location being addressable by the line of scanning from which the line segments were provided by the line segment processing means, each line segment having one or more pixels and being stored as information enabling the determination of depth and display information of each pixel within each stored line segment;
  (c) a depth buffer means having a number of addressable storage locations equal in number to the number of pixels along a single line of scanning, each storage location storing display information and depth information for a single pixel with each storage location having an address corresponding to a separate one of the pixels in a line of scanning of the display device, each storage location of the depth buffer means being initially loaded with background depth information and background display information;
  (d) a raster processing means coupled to the depth buffer means and the line segment memory for sequentially processing in time the line storage locations and from each line storage location processing the list of line segments to calculate the depth of each pixel within each line segment and causing the storage in the depth buffer means the display information and depth information for each pixel which has a depth with respect to the view reference plane which is less than the depth information in the depth buffer means which is stored at the corresponding address; and
  (e) a video processing means coupled to the depth buffer means for storing the display information stored within the depth buffer means for each line of scanning after the processing of the pixels within the list of segments is complete.

36. A computer graphics system for generating and displaying images without hidden surfaces on a view reference plane on a display device by scanning a plurality of scanning lines in a raster, with each line having a plurality of addressable pixels of a scene, having one or more three-dimensional objects in which each object has one or more planar surfaces comprising:
  (a) means for generating line segments for each of the lines of scanning of the intersection of the one or more planar surfaces with the line of scanning;
  (b) a line storage memory having a separate line storage location associated with each of the lines of scanning, the line segments for each of the lines of scanning being stored in the associated line storage location; and
  (c) means coupled to the line storage memory for processing sequentially on a line by line basis each of the pixels of each line segment stored within each line storage location to generate sequentially lines of display information, each line of display information being comprised of the pixels at each of the addressable locations along the line of scanning which are closest to the view reference plane.

37. A computer graphics system in accordance with claim 36 wherein each line storage location has a capacity for storing a fixed number of segments.

38. A computer graphics system in accordance with claim 36 wherein the means for processing includes a depth buffer means having a plurality of addressable storage locations equal in number to the number of pixels along a line of scanning and the depth of each of the pixels of each segment in a line storage location is compared with the depth of the pixel stored in the corresponding location in the depth buffer means and when during the comparison the calculated depth of the pixel is determined to be closer to the view reference plane, the pixel stored at the corresponding location of the depth buffer means is replaced with the pixel having a calculated depth closer to the view reference plane.

* * * * *